(12) United States Patent
Hirabayashi

(10) Patent No.: US 8,760,102 B2
(45) Date of Patent: Jun. 24, 2014

(54) ELECTRIC POWER TOOL

(75) Inventor: Tokuo Hirabayashi, Anjo (JP)

(73) Assignee: Makita Corporation, Anjo-shi, Aichi (JP)

( * ) Notice: Subject to any disclaimer, the term of this patent is extended or adjusted under 35 U.S.C. 154(b) by 166 days.

(21) Appl. No.: 13/566,461

(22) Filed: Aug. 3, 2012

(65) Prior Publication Data

US 2013/0033217 A1 Feb. 7, 2013

(30) Foreign Application Priority Data

Aug. 5, 2011 (JP) ................................. 2011-171898

(51) Int. Cl.
*H02P 1/18* (2006.01)
*B60L 15/20* (2006.01)

(52) U.S. Cl.
CPC ...................................... *B60L 15/20* (2013.01)
USPC ................... 318/546; 318/543; 318/3; 318/4; 318/5

(58) Field of Classification Search
CPC .............................. B60L 2200/26; B60L 15/20
USPC .......................................... 318/546, 543, 3–5
See application file for complete search history.

(56) References Cited

U.S. PATENT DOCUMENTS 5,563,482 A * 10/1996 Shaw et al. .................... 318/272

FOREIGN PATENT DOCUMENTS

| JP | A-2000-233306 | 8/2000 |
| JP | B2-3655481 | 6/2005 |
| JP | A-2005-193361 | 7/2005 |
| JP | B2-4227028 | 2/2009 |

* cited by examiner

*Primary Examiner* — David Luo
(74) *Attorney, Agent, or Firm* — Oliff PLC

(57) ABSTRACT

In an impact driver, a link unit (a link sleeve and first and second elongated protrusions) is provided between the mode switching ring for selecting an operation mode and the slide button for selecting the rotation speed. With the link unit, a switching operation of a slide button to the high-speed side is performed in coordination with a selecting operation of a mode switching ring to an impact mode or a vibration drill mode and the rotation speed is held at high speed.

19 Claims, 16 Drawing Sheets

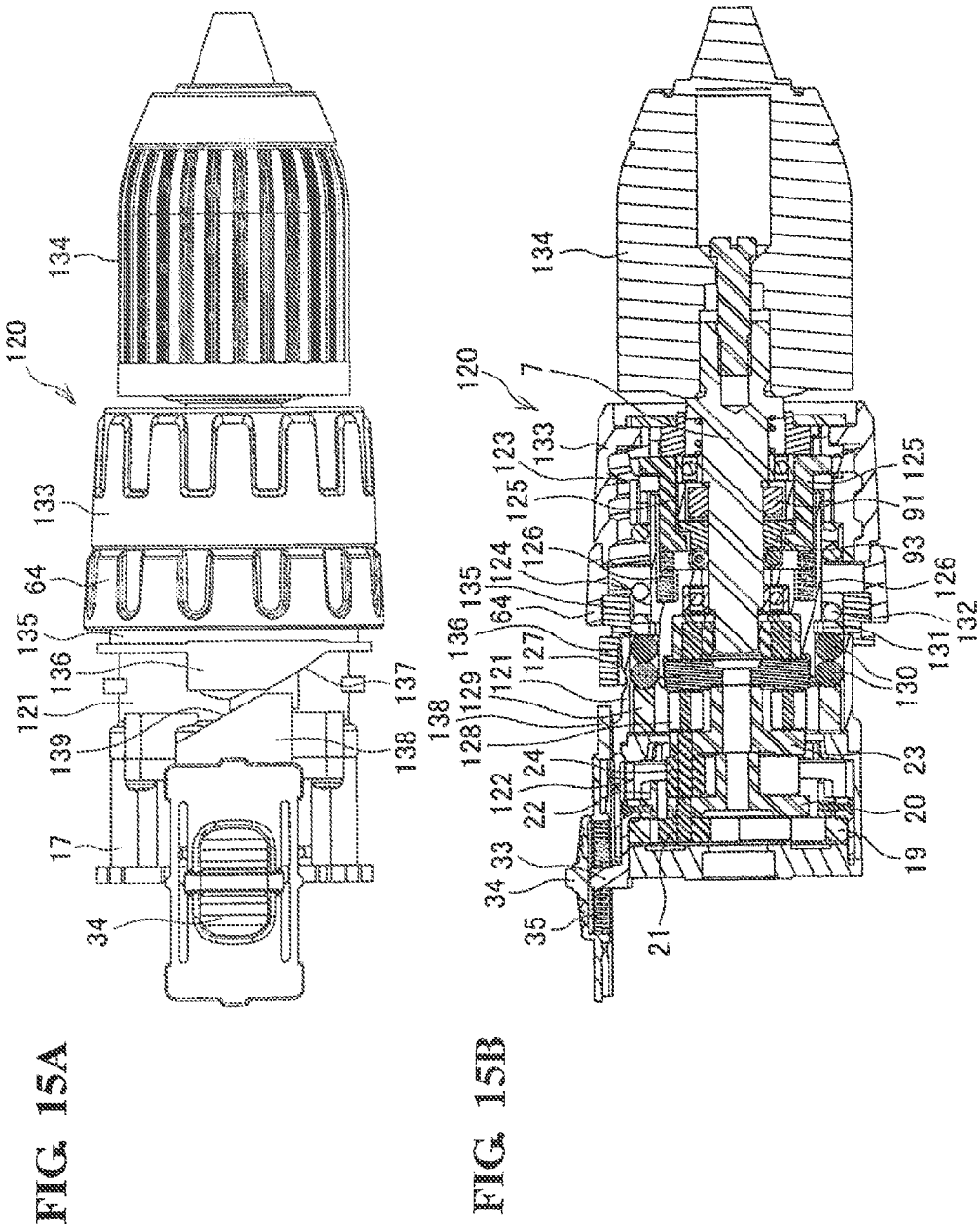

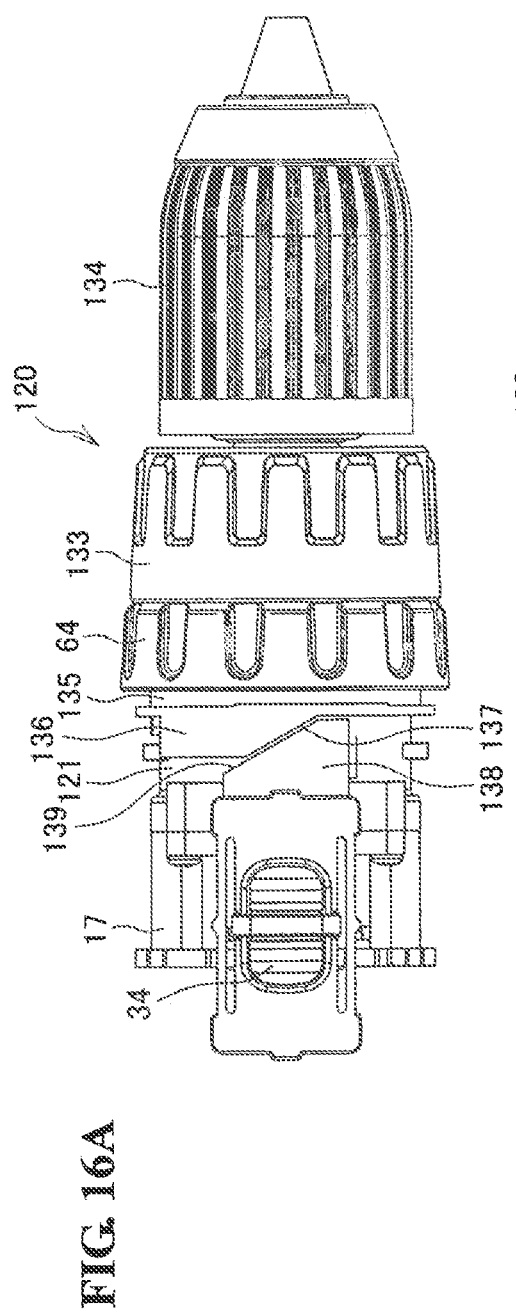
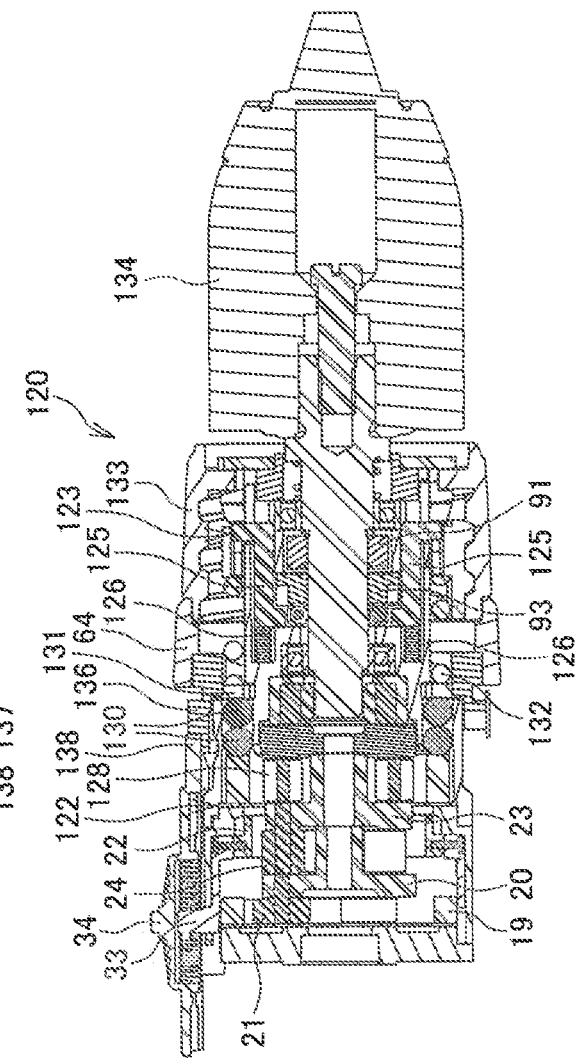
FIG. 16A
FIG. 16B

ELECTRIC POWER TOOL

BACKGROUND OF THE INVENTION

This application claims the benefit of Japanese Patent Application Number 2011-171898 filed on Aug. 5, 2011, the entirety of which is incorporated by reference.

TECHNICAL FIELD

The present invention relates to an electric power tool including a plurality of operation mechanisms that cause a final output shaft protruded forward from a housing to operate in a predetermined operation mode such as a vibration drill mode or an impact mode so as to enable selection and use of a desired operation mode.

BACKGROUND ART

A conventional electric power tool includes a final output shaft such as a spindle or anvil that is protruded forward of a housing accommodating a motor and transmits rotation from the motor. The housing includes a plurality of operation mechanisms where the final output shaft is operated in a predetermined operation mode, such that a desired operation mechanism can be selected and used through manipulation of a mode switching member. For example, Japanese Patent No. 4227028 and Japanese Patent No. 3655481 disclose a driver drill in which switching of a vibration drill mode, a drill mode, a clutch mode, and the like is performed through a rotating operation of a change ring (mode switching member) provided at the front end of a housing.

In the electric power tools, torque is transmitted to a final output shaft from a motor through a planetary gear reduction mechanism arranged therebetween. In a transmission mechanism adopted herein, one internal gear of the planetary gear reduction mechanism is movable in the axial direction so as to enable switching between a high-speed mode and a low-speed mode. In the high-speed mode, the internal gear simultaneously meshes with a planet gear and a carrier thereof to cancel the speed reduction by the planet gear in this stage. On the other hand, in the low-speed mode, the internal gear meshes with only the planet gear to allow the speed reduction by the planet gear in this stage. The switching of speeds can be performed by manipulating a speed switching member provided to the housing.

By providing the mode switching member and the speed switching member separately in this manner, it becomes possible to select the speed in the selected operation mode. However, in the predetermined operation mode such as the vibration drill mode or the impact mode, the high-speed mode is selected most of the time, and it is rare that the low-speed mode is actually used. Therefore, for example, when the operation mode is switched to the vibration drill mode with the mode switching member after the clutch mode or the drill mode is used at low speed, the speed switching member must be subsequently switched to the high-speed mode. This is cumbersome since operation is required for two members. There have been cases of a decrease in performance, particularly when it is forgotten to manipulate the speed switching member upon switching to the vibration drill mode and it is found that the low-speed mode is still held after work is started, the work must be temporarily stopped to appropriately manipulate the speed switching member.

SUMMARY OF THE INVENTION

It is on object of the present invention to provide an electric power tool that, even in a case where a mode switching member and a speed switching member are provided separately, requires no manipulation of the speed switching member in a predetermined operation mode that is only used in a high-speed mode, so that user-friendliness is achieved without causing a decrease in performance.

In order to achieve the object described above, an electric power tool according to a first aspect of the invention includes a final output shaft, a plurality of operation mechanisms, a mode switching member, a transmission mechanism, a speed switching member, and a link unit. The final output shaft protrudes forward of a housing accommodating a motor from which rotation is transmitted to the final output shaft. By the plurality of operation mechanisms, the final output shaft is operated in a predetermined operation mode. The mode switching member enables a selecting operation for the operation mode. The transmission mechanism enables switching of rotation speed of the final output shaft between two stages of high and low. The speed switching member enables a selecting operation for the rotation speed. The link unit is provided between the mode switching member and the speed switching member. With the link unit, a switching operation of the speed switching member to a high-speed side is performed in coordination with the selecting operation of the mode switching member to the predetermined operation mode and the rotation speed is held at high speed.

A second aspect of the invention provides a configuration according to the first aspect, in which the operation mode is selectable by a rotating operation of the mode switching member, and the speed switching member is provided in a rear of the mode switching member to be slidable in a front-rear direction between a forward position for high speed and a backward position for low speed.

A third aspect of the invention provides a configuration according to the second aspect, in which the link unit includes a link member, a first protruding portion, and a second protruding portion. The link member is connected to the rear of the mode switching member to rotate integrally. The first protruding portion is provided along a rotational direction on an outer surface of the link member. In a switching position for the predetermined operation mode, the first protruding portion engages with a tower surface of the speed switching member in the forward position to restrict a backward movement of the speed switching member. The second protruding portion is connected with and inclined from the first protruding portion. Further, the second protruding portion engages with the lower surface of the speed switching member in the backward position along with a rotation of the link member to cause the speed switching member to move forward and engage with the first protruding portion.

A fourth aspect of the invention provides a configuration according to the first aspect, in which the operation mode is selectable by a rotating operation of the mode switching member. The speed switching member is provided in a rear of the mode switching member to be slidable in a front-rear direction between a backward position for high speed and a forward position for low speed.

A fifth aspect of the invention provides a configuration according to the fourth aspect, in which the link unit is a link plate that is provided on a side of the mode switching member to protrude rearward. In a switching position for the predetermined operation mode, the link plate contacts the speed switching member in the backward position to restrict a forward movement of the speed switching member. An inclined guide portion is provided at a side edge of the link plate so as to contact the speed switching member in the forward position along with a rotation of the mode switching member to slide the speed switching member to the backward position.

A sixth aspect of the invention provides a configuration according to the first aspect, in which the plurality of operation mechanisms include a vibration mechanism that provides vibration in an axial direction to the final output shaft, and the predetermined operation mode is a vibration drill mode in which the vibration mechanism is activated.

According to the first aspect of the invention, manipulation of the speed switching member becomes unnecessary in a predetermined operation mode used only in the high-speed mode, even in a case where the mode switching member and the speed switching member are provided separately. Thus, user-friendliness is achieved and a decrease in performance does not occur.

According to the second to fifth aspects of the invention, the link unit can be formed easily.

According to the sixth aspect of the invention, user-friendliness in the vibration drill mode used mostly in the high-speed mode can be improved, in addition to the effect of the first aspect.

BRIEF DESCRIPTION OF THE DRAWINGS

FIGS. 15A and 15B are illustrative views of a vibration driver drill, respectively showing a plane of a unit portion in the vibration drill mode and a vertical section thereof.

FIGS. 16A and 16B are illustrative views of the vibration driver drill, respectively showing a plane of the unit portion in the clutch mode and a vertical section thereof.

DETAILED DESCRIPTION OF THE EMBODIMENTS

An embodiment of the present invention will be described below based on the drawings.

Figure 1:
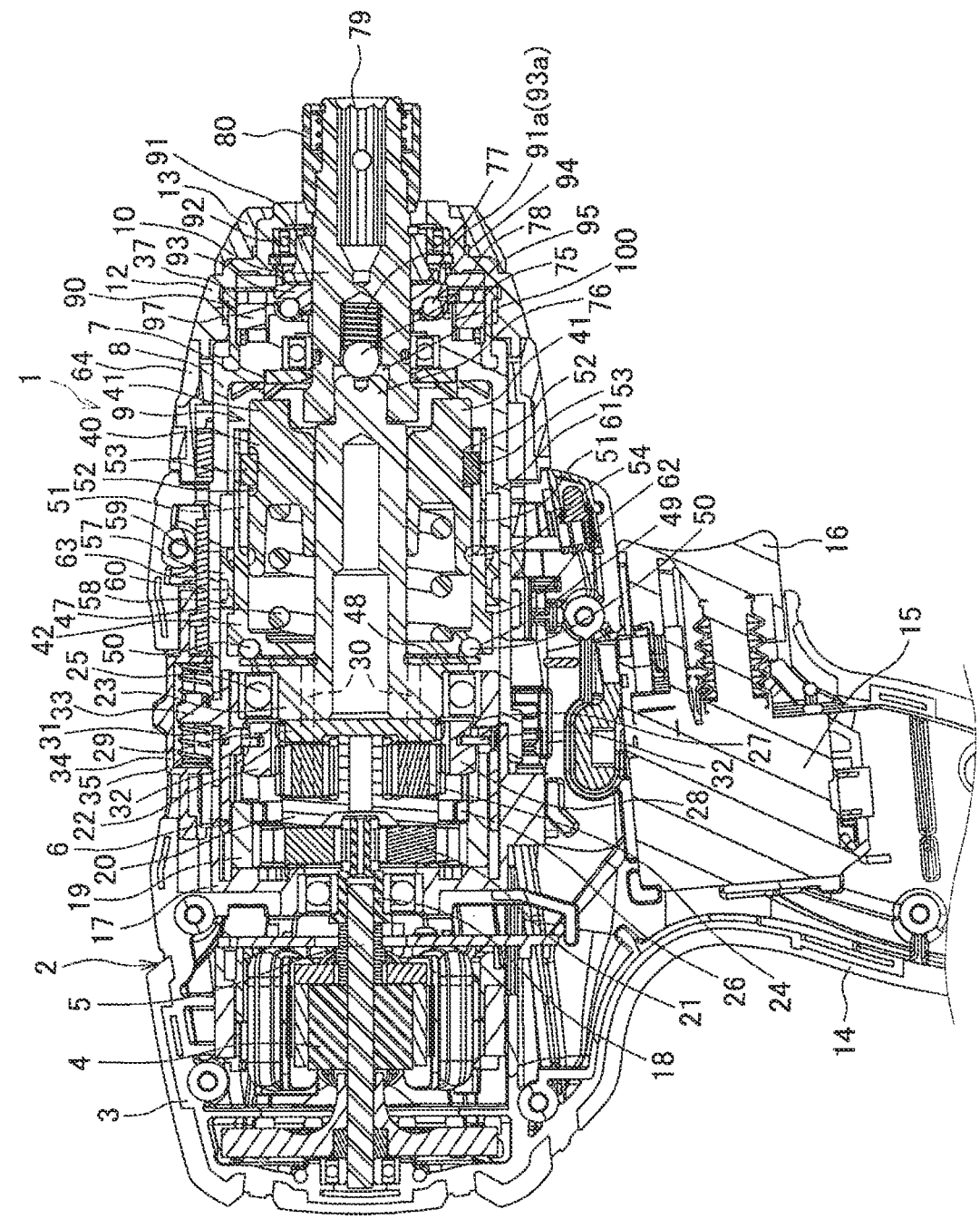
FIG. 1 is a partial vertical-sectional view of an impact driver.
Figure 2:
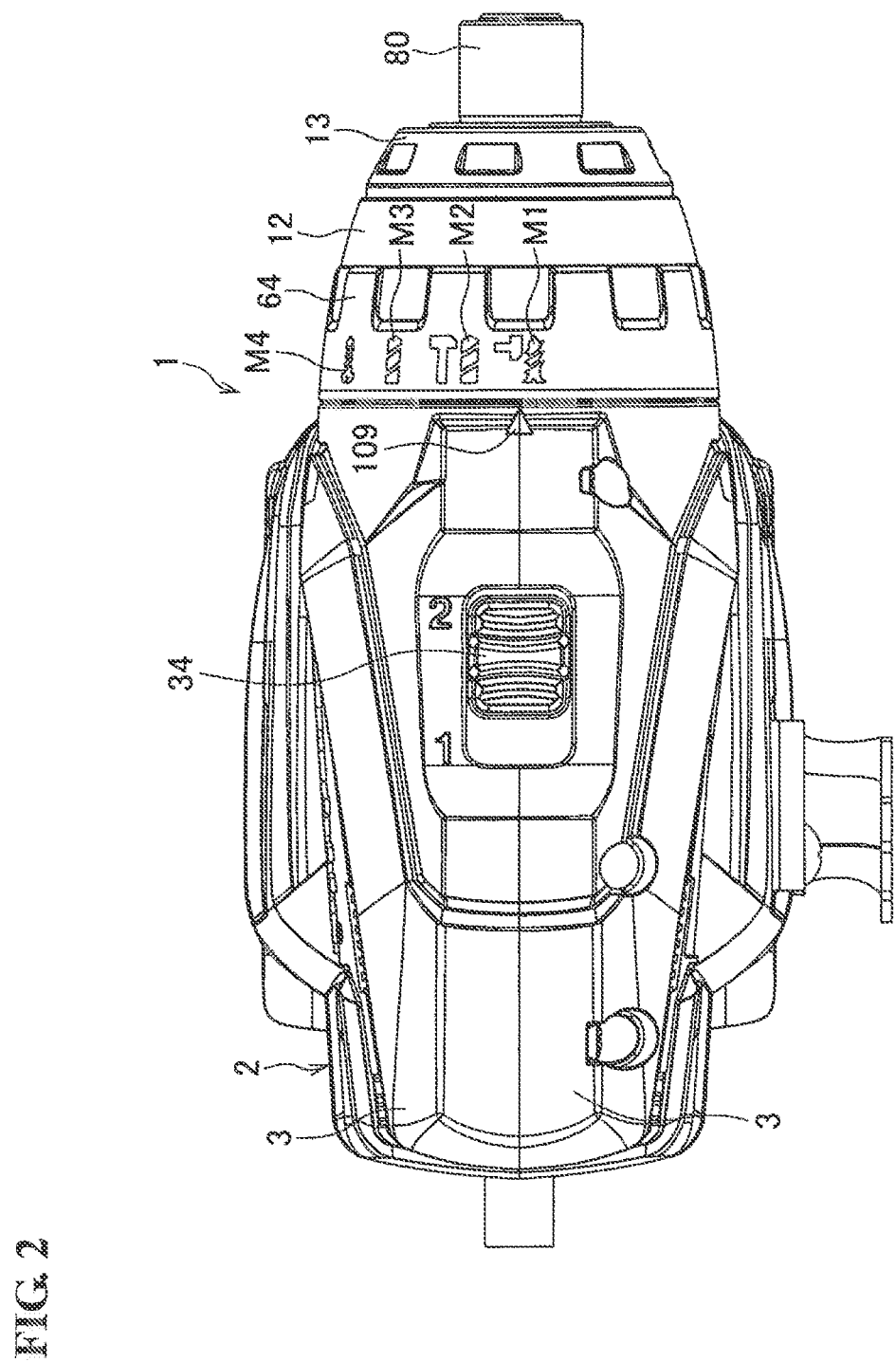
FIG. 2 is a plan view of the impact driver.
Figure 3:
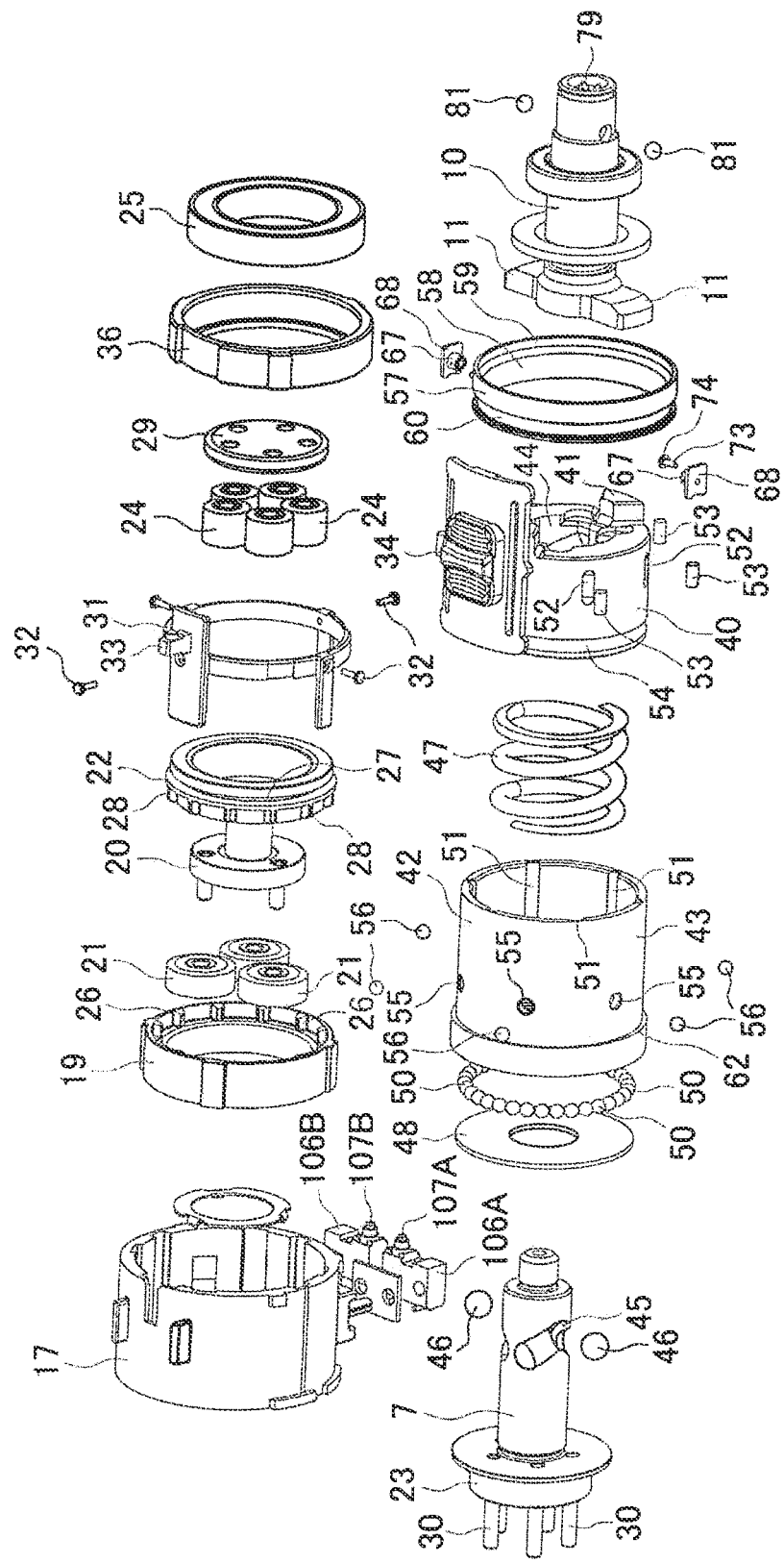
FIG. 3 is an exploded perspective view of an internal mechanism.
Figure 4:
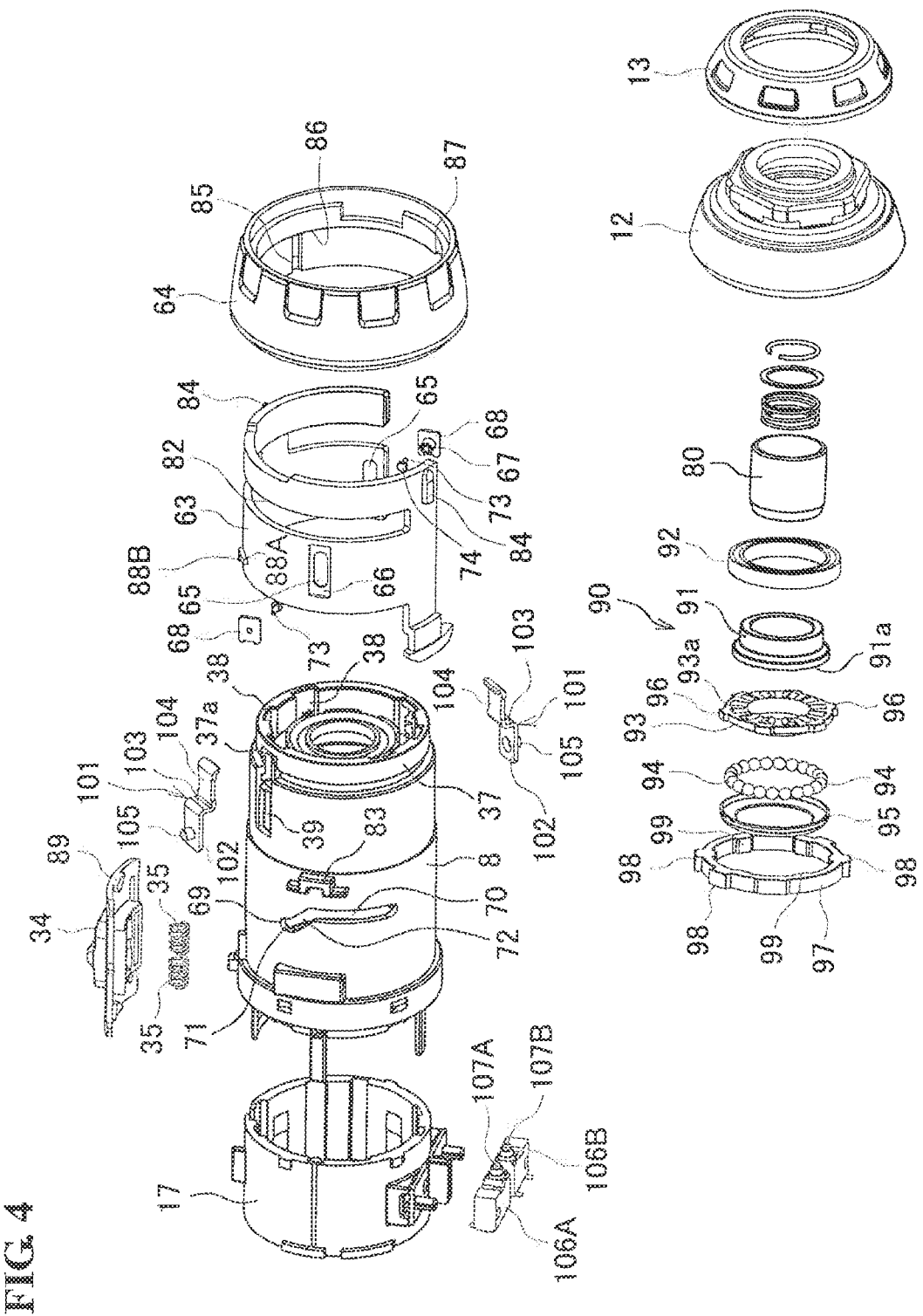
FIG. 4 is an exploded perspective view of a housing and a vibration mechanism other than a body housing.

FIGS. 1 and 2 show an impact driver 1 as one example of an electric power tool, and FIGS. 3 and 4 show a part of an internal mechanism thereof. The impact driver 1 has a body housing 2 formed by assembling left and right half housings 3. In the body housing 2, a motor 4, a planetary gear reduction mechanism 6, and a spindle 7 are respectively accommodated in this order from the rear (with the right side in FIG. 1 being the front). In the front portion of the body housing 2, a cylinder-shaped inner housing 8 accommodating a striking mechanism 9 that serves as an operation mechanism together with the spindle 7 is assembled. An anvil 10 serving as a final output shaft, which is arranged coaxially with and in front of the spindle 7, is rotatably supported by the inner housing 8 and a front housing 12 fixed at the front end thereof so as to protrude forward. In the front housing 12, a vibration mechanism 90 serving as an operation mechanism is accommodated. The planetary gear reduction mechanism 6 and the mechanisms on the front side excluding the body housing 2 form a unit. Reference numeral 13 denotes a ring-shaped bumper made of rubber that is fitted at the front end of the front housing 12. Below the body housing 2, a handle 14 is provided to extend downward. In the handle 14, a switch 15 including a trigger 16 is accommodated.

<Planetary Gear Reduction Mechanism and Transmission Mechanism>

The planetary gear reduction mechanism 6 is accommodated in a cylinder-shaped gear housing 17 assembled in the body housing 2. In the rear portion of the gear housing 17, a pinion 18 fitted to an output shaft 5 of the motor 4 is rotatably supported and protrudes in the gear housing 17. The planetary gear reduction mechanism 6 includes a first carrier 20 holding first-stage planet gears 21 that make planetary motion in a first internal gear 19 and a second carrier 23 holding second-stage planet gears 24 that make planetary motion in a second internal gear 22, such that the first-stage planet gears 21 mesh with the pinion 18. The second carrier 23 is formed integrally with the rear end of the spindle 7 and rotatably supported by a ball bearing 25 in the inner housing 8.

Herein, the first internal gear 19 includes a plurality of internal teeth 26 at predetermined intervals in the circumferential direction on the front inner circumference side. The second internal gear 22 includes a ring-shaped engaging groove 27 on the front outer circumference side and a plurality of outer teeth 28 provided to protrude at predetermined intervals in the circumferential direction on the rear outer circumference side. The second internal gear 22 is provided to be slidable between the forward position and the backward position. In the forward position, the second internal gear 22 meshes with both a spur gear 29 connected integrally with the rear of the second carrier 23 and the second-stage planet gear 24. In the backward position, the outer tooth 28 engages with the internal tooth 26 of the first internal gear 19 so that the second internal gear 22 meshes only with the second-stage planet gear 24.

The spur gear 29 is a separate gear located between the second carrier 23 and the planet gear 24 and penetrated by a support pin 30 that supports the planet gear 24. The outer diameter of the second carrier 23 is smaller than the outer diameter of the spur gear 29 including the tooth tip. Reference numeral 36 denotes a holding ring that holds the ball bearing 25 in the gear housing 17.

Figure 5:
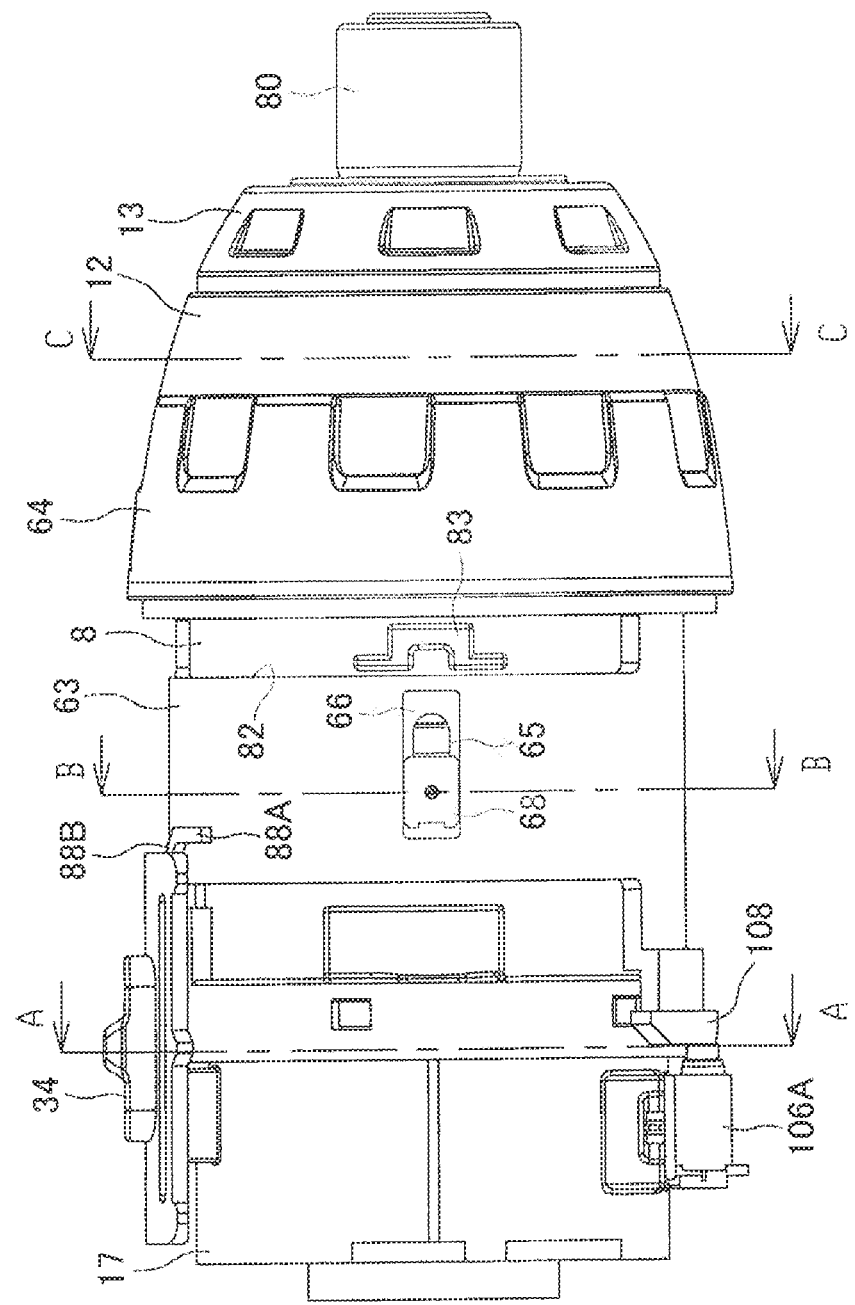
FIG. 5 is a left side view of a unit portion.
Figure 6A:
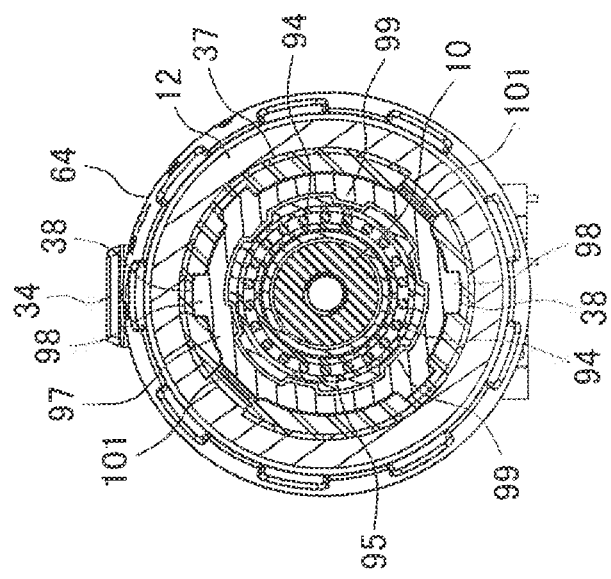
FIG. 6A is a sectional view along line A-A.

On the outside of the second internal gear 22, a slide ring 31 that is slidable forward or backward along the inner circumferential surface of the gear housing 17 and the inner housing 8 is provided, and an engagement pin 32 that penetrates the slide ring 31 in the radial direction from the outside is engaged with the engaging groove 27 of the second internal gear 22. On the outer circumference of the upper portion of the slide ring 31, a protrusion 33 that protrudes through the upper portion of the gear housing 17 is provided. As shown in FIGS. 5 and 6A, the protrusion 33 is held by a slide button 34 via coil springs on the front and rear sides of the protrusion 33.

The slide button 34 serves as a speed switching member that is provided to the body housing 2 so as to be slidable forward or backward, As described above, a transmission mechanism is capable of switching the position of the second internal gear 22 forward or backward via the slide ring 31 by a slide operation of the slide button 34 to the front or the rear. That is, a high-speed mode (second speed) in which the second internal gear 22 rotates integrally with the spur gear 29 to cancel the planetary motion of the planet gear 24 is achieved in the forward position of the second internal gear 22 shown in FIGS. 1, 2, and 8. On the other hand, a low-speed mode (first speed) in which the second internal gear 22 is fixed to make the planetary motion of the planet gear 24 is achieved in the backward position of the second internal gear 22 shown in FIG. 12.

<Striking Mechanism>

The striking mechanism 9 has a structure by which a hammer is engaged with or disengaged from a pair of arms 11 provided at the rear end of the anvil 10. The hammer herein is divided into a cylinder-shaped main hammer 40 and a sub hammer 42 having a bottomed cylinder shape that opens to the front. The main hammer 40 is fitted to the exterior of the front end of the spindle 7 and provided with a pair of pawls 41 that protrude at the front surface to engage with the arms 11. The spindle 7 is loosely inserted to the sub hammer 42 so as to be coaxial therewith at the rear of the main hammer 40. A circumference wall 43 of the sub hammer 42 is fitted to the exterior of the main hammer from the rear. The diameter formed of the diameter of the main hammer 40 and the thickness of the circumference wall 43 of the sub hammer 42 is equal to the outer diameter of a conventional hammer.

The main hammer 40 is connected to the spindle 7 via balls 46 that are fitted between reversed V-shaped grooves 44 and V-shaped grooves 45. The reversed V-shaped grooves 44 are provided to extend from the front end toward the rear on the inner circumferential surface of the main hammer 40 and are tapered at the rear end. The V-shaped grooves 45 are provided on the outer circumferential surface of the spindle 7 such that the front end thereof faces the front.

Between the main hammer 40 and the sub hammer 42, a coil spring 47 is fitted to the exterior of the spindle 7, so that the main hammer 40 is biased to the forward position in which the pawl 41 engages with the arm 11 and the sub hammer 42 is biased rearward. Between the sub hammer 42 and the second carrier 23, a washer 48 is fitted to the exterior of the spindle 7. At a ring groove 49 provided on the rear surface of the sub hammer 42, a plurality of balls 50 that protrude from the rear surface are accommodated to form a thrust bearing. The sub hammer 42 biased rearward by the coil spring 47 is pressed in a rotatable state to the rear position in which the ball 50 contacts the washer 48.

On the inner circumferential surface of the circumference wall 43 of the sub hammer 42, a plurality of guide grooves 51 extending from the front end in the axial direction to the rear are formed at equal intervals in the circumferential direction. On the outer circumference of the main hammer 40, a plurality of oval grooves 52 that are each shorter than the guide groove 51 are formed at the same intervals as the guide grooves 51 in the circumferential direction. Column-shaped connecting pins 53 are fitted between the guide groove 51 and the oval groove 52. The main hammer 40 and the sub hammer 42 are connected by the connecting pin 53 so as to move individually in the axial direction and integrally in the rotational direction.

Furthermore, on the outer circumferential surface of the main hammer 40 at the rear end, a ring-shaped fitting groove 54 is provided in the circumferential direction. On the circumference wall 43 of the sub hammer 42, a plurality of circular holes 55 that pass through the circumference wall 43 in the radial direction are formed between the guide grooves 51 in the rear end position of the guide groove 51. Each ball 56 is fitted with the circular hole 55.

A switching ring 57 is fitted to the exterior of the circumference wall 43 of the sub hammer 42. The switching ring 57 is stepped to have two diameters, that is, to have a small diameter portion 58 at the rear side and a large diameter portion 59 at the front side. The small diameter portion 58 slidingly contacts the outer circumferential surface of the circumference wall 43 and a large diameter portion 59 is apart from the outer circumferential surface of the circumference wall 43 in the radial direction. On the outer circumferential surface of the small diameter portion 58, a ring-shaped groove 60 is formed. The switching ring 57 is slidable forward or backward only between a front side step portion 61 provided on the inner circumference of the inner housing 8 and a rear side step portion 62 provided on the outer circumference at the rear end of the circumference wall 43.

As shown in FIGS. 4 and 5, a link sleeve 63 serving as a link member is fitted to the exterior of the inner housing 8. To the front end outer circumference of the link sleeve 63, a mode switching ring 64 serving as a mode switching member located at the front of the body housing 2 is fitted so as to be integrally rotatable. In point-symmetrical positions on the outer circumference of the link sleeve 63, a pair of through holes 65 that are oval and long in the front-rear direction are formed. On the outer circumferential surface along each through hole 65, a quadrangle-shaped guide recess portion 66 slightly larger than the through hole 65 is formed.

Figure 6B:
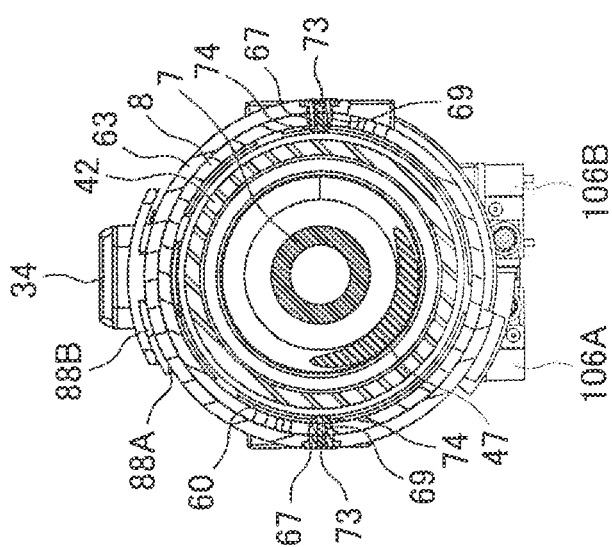
FIG. 6B is a sectional view along line B-B.

A cylinder-shaped guide holder 67 is formed at a square-shaped flange portion 68 of which an outer side end portion fits with the guide recess portion 66. The cylinder-shaped guide holder 67 penetrates the through hole 65 to protrude to the shaft center side of the link sleeve 63 in the radial direction and is made movable in the front-rear direction by the flange portion 68 being guided by the guide recess portion 66. In the inner housing 8, a guide groove 69 is provided. The guide groove 69 includes a front side groove 70, a rear side groove 71 and an inclined groove 72. The front side groove 70 is formed in the circumferential direction in a position corresponding to the front end of the through hole 65. The rear side groove 71 is formed in the circumferential direction in a position corresponding to the rear end of the through hole 65. The inclined groove 72 connects the front side groove 70 and the rear side groove 71, such that the guide holder 67 penetrates therethrough. As also shown in FIG. 6B, a guide pin 73 is inserted in the guide holder 67 from the shaft center side of the inner housing 8, and a head portion 74 of the guide pin 73 is fitted with the groove 60 of the switching ring 57.

In the anvil 10, a small-diameter tip end portion 76 provided to protrude at the front end of the spindle 7 is fitted in a bearing hole 75 formed on the rear surface at the shaft center, so that the anvil 10 coaxially supports the front end of the spindle 7 in a rotatable manner. The bearing hole 75 accommodates a ball 78 that is pressed by the end surface of the tip end portion 76 due to a coil spring 77 to receive load in the thrust direction.

Furthermore, at the front end of the anvil 10 protruding from the front housing 12, a mounting hole 79 for a bit is provided, and a chuck mechanism including a sleeve 80 or the like that presses a ball 81 (see FIG. 3) provided to the anvil 10 into the mounting hole 79 in the backward position is provided in order to mount and retain the bit inserted in the mounting hole 79.

<Vibration Mechanism>

The vibration mechanism 90 is accommodated inside a front cylinder 37 joined coaxially with the front surface of the inner housing 8 and the front housing 12 fitted to the exterior of the front cylinder 37. In the front housing 12, as also shown in FIG. 4, a first cam 91 formed with a cam surface 91*a* at the rear surface is secured integrally to the anvil and rotatably supported by a ball bearing 92 in the front housing 12. At the rear of the first cam 91, a second cam 93 formed with a cam surface 93*a* at the front surface is rotatably fitted to the exterior of the anvil 10. The rear surface of the second cam 93 is held by a plurality of balls 94 accommodated along a ring-shaped receiving metal 95 at the front surface of the inner housing 8, such that the cam surface 93*a* is engaged with the cam surface 91*a* of the first cam 91 in a normal state. On the outer circumference of the second cam 93, a plurality of protrusions 96 that protrude in the radial direction are formed at equal intervals in the circumferential direction.

Figure 6C:
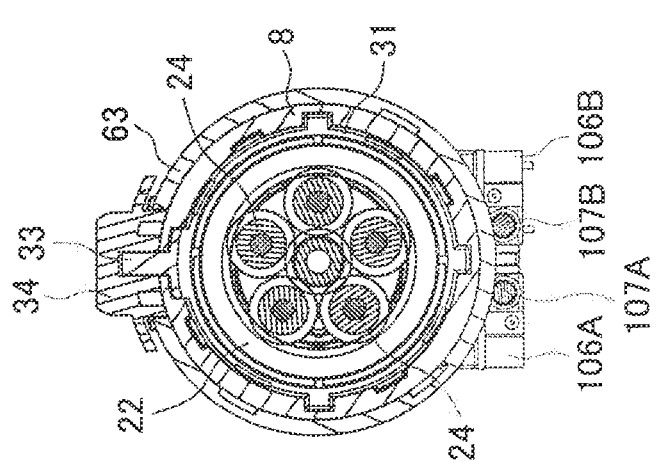
FIG. 6C is a sectional view along line C-C.

In the front cylinder 37, a vibration switching ring 97 is provided. The vibration switching ring 97 is a ring body having an inner diameter larger than the outer diameter of the second cam 93. As shown in FIG. 6C, a plurality of outer protrusions 98 provided on the outer circumference are fitted in restriction grooves 38 provided on the inner surface of the front cylinder 37 and extending in the axial direction, so that the vibration switching ring 97 is held to be movable forward or backward in a state where rotation is restricted in the front cylinder 37. On the inner circumference of the vibration switching ring 97, an inner protrusion 99 is provided to engage with the protrusion 96 of the second cam 93 in a state where the vibration switching ring 97 is fitted to the exterior of the second cam 93. In other words, the rotation of the second cam 93 is restricted in the forward position in which the vibration switching ring 97 is fitted to the exterior of the second cam 93, and the rotation of the second cam 93 is allowed in the backward position in which the vibration switching ring 97 is apart from the second cam 93. It should be noted that a coil spring 100 is provided between the vibration switching ring 97 and the inner housing 8 in the front cylinder 37, so that the vibration switching ring 97 is biased to the forward position.

A pair of link plates 101 are latched to the vibration switching ring 97. The link plates 101 are band-shaped metal plates arranged point-symmetrically on the side surface at the front portion of the inner housing 8. Each of the link plates 101 has a rear plate portion 102, a middle plate portion 103, and a front plate portion 104. The rear plate portion 102 fits in the corresponding one of a pair of outer grooves 39 formed on the side surface of the inner housing 8 extending in the front-rear direction. The middle plate portion 103 goes a through hole 37*a* provided in the front cylinder 37 and bends inward from the rear plate portion 102. The front plate portion 104 protrudes forward along the inner surface of the front cylinder 37 from the middle plate portion 103 such that the front end thereof bends inward. Thus, the link plate 101 is movable in the front-rear direction due to the rear plate portion 102 being guided by the outer groove 39. The rear plate portion 102 is fitted with the outer groove 39, and does not protrude from the outer circumferential surface of the inner housing 8. Reference numeral 105 denotes an engaging protrusion that is provided on the outer surface of the rear plate portion 102 to protrude outward. Each link plate 101 is biased together with the vibration switching ring 97 to the forward position due to the front end of the front plate portion 104 being latched to the front surface of the vibration switching ring 97 from the outside.

The link sleeve 63 fitted to the exterior of the inner housing 8 is a cylinder-shaped body with a C-shaped cross section in which a part of the link sleeve 63 in the circumferential direction is cut out along the whole length in the axial direction. The link sleeve 63 has a cutout 82 extending along the circumferential direction at the middle portion. A guide protrusion 83 provided to the outer circumferential surface of the inner housing 8 is fitted with the cutout 82, so that the link sleeve 63 can rotate while a movement thereof in the front-rear direction is restricted. On the outer circumferential surface at the front side of the link sleeve 63, a connecting protrusion 84 that fits with a connecting groove 85 provided extending in the front-rear direction on the inner circumferential surface at the rear side of the mode switching ring 64 is provided. By the fitting of the connecting groove 85 and the connecting protrusion 84, the mode switching ring 64 and the link sleeve 63 are connected integrally in the rotational direction.

Figure 7A:
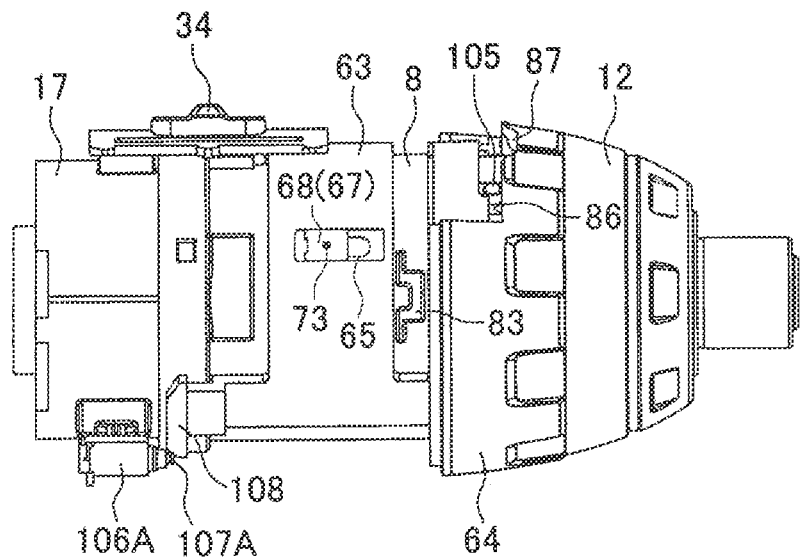
FIG. 7A is a left side view of the unit portion in an impact mode.

In the connected state, as shown in FIG. 7A, the engaging protrusion 105 of the link plate 101 is located between the front end of the link sleeve 63 and a step portion 86. The step portion 86 is provided along the circumferential direction on the inner circumferential surface of the mode switching ring 64. A part of the step portion 86 is a recess portion 87 provided to recess toward the front. Both sides of the recess portion 87 in the circumferential direction are inclined in a tapered manner. When the engaging protrusion 105 is located in the recess portion 87, the vibration switching ring 97 biased to the front side by the coil spring 100 is allowed to move to the forward position. On the other hand, when the engaging protrusion 105 is located at the step portion 86 other than the recess portion 87, the link plate 101 moves backward and the vibration switching ring 97 moves to the backward position against the bias of the coil spring 100.

On the outer circumferential surface at the rear side of the link sleeve 63, as shown in FIGS. 4 and 5, a first elongated protrusion 88A and a second elongated protrusion 88B are provided. The first elongated protrusion 88A serves as a first protruding portion along the circumferential direction. The second elongated protrusion 88B serves as a second protruding portion inclined linearly from the end portion of the first elongated protrusion 88A toward the rear along the circumferential direction. In a corner portion at the front end and on the left side (left side being a direction when seen from the front, hereinafter, "left" and "right" represent directions seen from the front) on the lower surface of the slide button 34, a receiving protrusion 89 that engages with the tip end of the second elongated protrusion 88B when the link sleeve 63 rotates at the backward position for the first speed is provided. Thus, when the link sleeve 63 rotates naturally, the receiving protrusion 89 is guided forward along the second elongated protrusion 88B, so that the slide button 34 moves forward. When the receiving protrusion 89 moves up to the front of the first elongated protrusion 88A, the slide button 34 reaches the forward position for the second speed.

On the lower surface of the gear housing 17 at the rear of the inner housing 8, a pair of microswitches 106A and 106B are arranged such that plungers 107A and 107B are directed forward. At the rear end of the link sleeve 63, a contact member 108 is provided. The contact member 108 performs pushing or release of the plungers 107A and 107B of the microswitches 106A and 106B in a predetermined switching position of the link sleeve 63. The microswitches 106A and 106B output an ON or OFF signal of a clutch mode to a controller (not shown) provided at the lower end of the handle 14 of the impact driver 1. The controller monitors a torque value obtained from a torque sensor (not shown) provided to the motor 4 when the ON signal is input upon pushing of the plunger 107B of the microswitch 106B and applies a brake to the motor 4 to block the torque transmitted to the anvil 10 when a set torque value is reached.

<Selection of Operation Mode>

The rotation position (switching position) of the mode switching ring 64 and the link sleeve 63 and each operation mode regarding the impact driver 1 configured as described above will be described.

Impact Mode

Figure 7B:
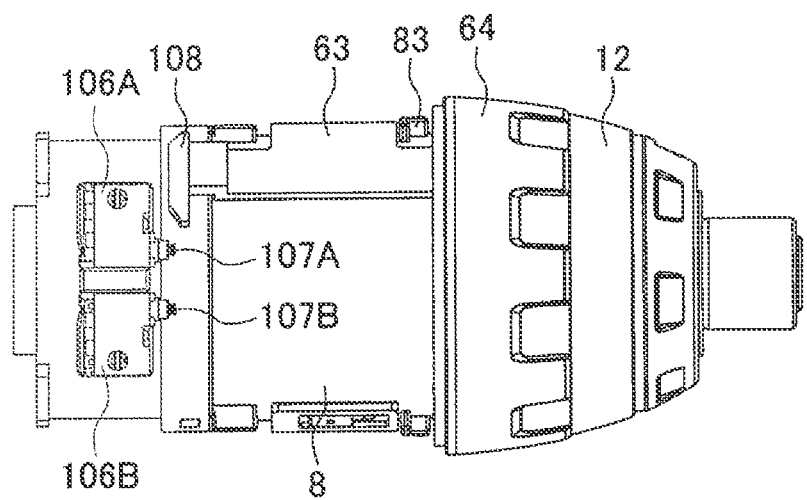
FIG. 7B is a bottom view thereof.
Figure 8:
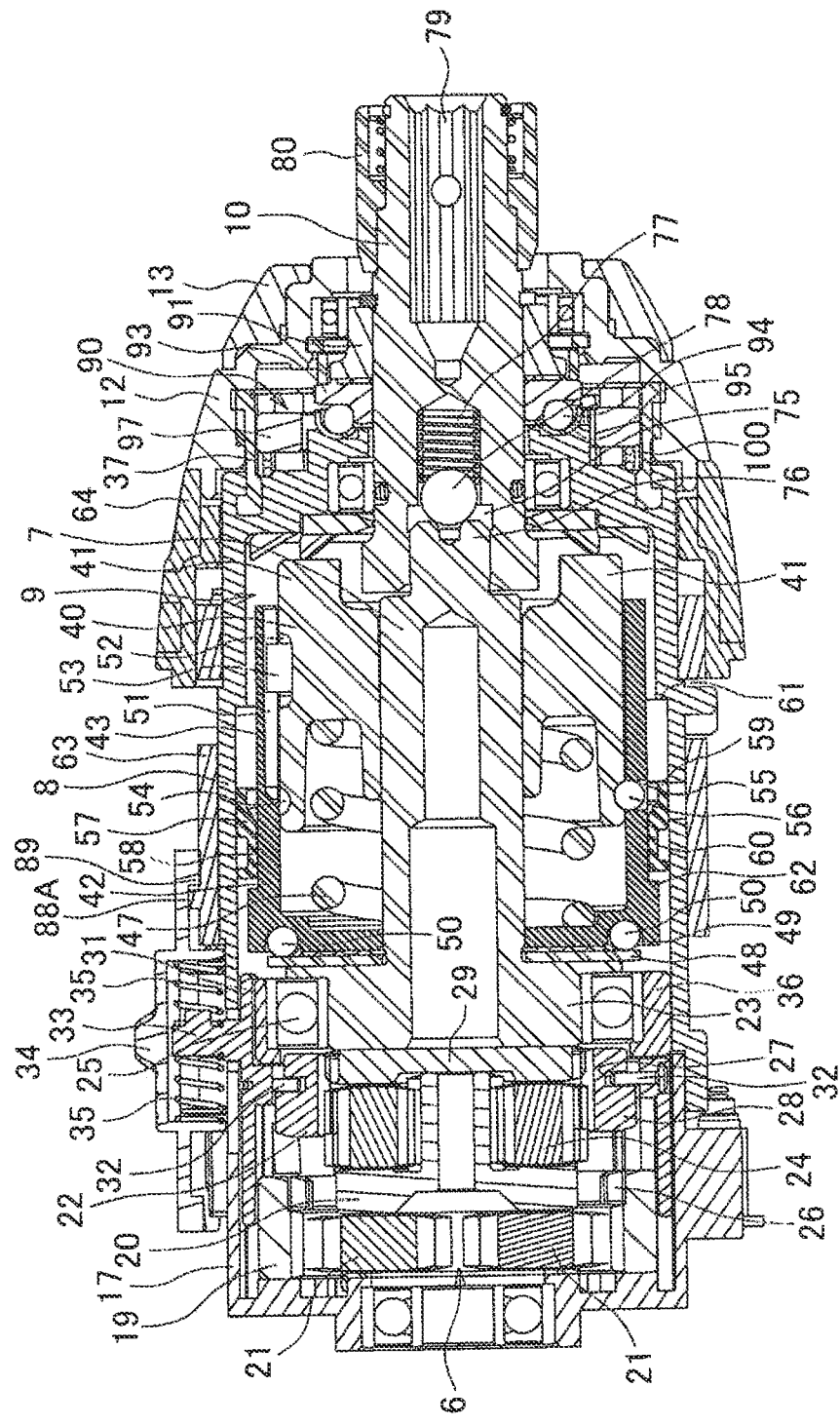
FIG. 8 is a vertical-sectional view of the unit portion in the impact mode.

First, in a first position in which the mode switching ring 64 is rotated to the rightmost position when seen from the front as shown in FIGS. 7A and 7B, the guide holder 67 also moves in the right rotation direction and moves in the guide groove 69 to reach the rear side groove 71. The guide holder 67 is located at the rear end of the through hole 65. Then, the switching ring 57 connected to the guide holder 67 via the guide pin 73 is in the backward position in which the large diameter portion 59 is located outside the ball 56, as shown in FIG. 8. In the backward position, the ball 56 can move to a release position to sink in the inner circumferential surface of the circumference wall 43 and be apart from the fitting groove 54 of the main hammer 40, thus achieving an impact mode that allows a backward movement of the main hammer 40.

At this time, the first elongated protrusion 88A is located in the rear of the receiving protrusion 89 of the slide button 34 to move the slide button 34 to the forward position. Therefore, a backward movement of the slide button 34 is restricted, and the high-speed mode is achieved constantly. The engaging protrusion 105 of the link plate 101 is displaced to the left side from the recess portion 87 and latched to the step portion 86. Therefore, the link plate 101 is in the backward position, causing the vibration switching ring 97 to move backward and allowing the second cam 93 to rotate. (It should be noted that in FIG. 7A and the subsequent side views of a unit portion, the mode switching ring 64 is shown with a partial cutout for the sake of illustrating the position of the engaging protrusion 105.) The contact member 108 is not in contact with either of the plungers 107A and 107B of the microswitches 106A and 106B.

Therefore, when the trigger 16 provided to the handle 14 is manipulated to drive the motor 4, the rotation of the output shaft 5 is transmitted to the spindle 7 via the planetary gear reduction mechanism 6, rotating the spindle 7. The spindle 7 causes the main hammer 40 to rotate via the ball 46, and the anvil 10 is engaged with the main hammer 40 to rotate. Therefore, thread fastening or the like is possible with a bit fitted to the tip end of the anvil 10. At this time, the sub hammer 42 connected to the main hammer 40 in the rotational direction via the connecting pin 53 also rotates integrally with the main hammer 40. It should be noted that even if the first cam 91 is rotated along with the rotation of the anvil 10, the second cam 93 engaged with the first cam 91 is allowed to rotate. Therefore, the second cam 93 also rotates integrally, and vibration does not occur in the anvil 10.

When the torque of the anvil 10 is increased by further thread fastening, a difference occurs between the rotation of the main hammer 40 and the rotation of the spindle 7. Therefore, the ball 46 rolls along the V-shaped groove 45, causing the main hammer 40 to move backward against the bias of the coil spring 47 while rotating relatively with respect to the spindle 7. The sub hammer 42 at this time rotates integrally with the main hammer 40 with the connecting pin 53 therebetween while allowing a backward movement of the main hammer 40.

Then, when the pawl 41 of the main hammer 40 is disengaged from the arm 11, the coil spring 47 is biased and the ball 46 is rolled toward the tip end of the V-shaped groove 45, and then the main hammer 40 is moved forward while rotating. Thus, the pawl 41 of the main hammer 40 engages with the arm 11 again to generate a rotational striking force (impact). By repeating the engagement with and disengagement from the anvil 10, the tightness is increased.

In the above state, the sub hammer 42 also rotates together with the main hammer 40, and the engagement with and disengagement from the anvil 10 involves a sum of the mass of the hammers 40 and 42. Due to the rotational resistance being reduced by the ball 50 on the rear surface rolling on the front surface of the washer 48 at the time of rotation, the sub hammer 42 can rotate smoothly even if the coil spring 47 is extended or compressed along with the front or back movement of the main hammer 40. Furthermore, even if the main hammer 40 repeats the front or back movement at the time of impact occurrence, the sub hammer 42 maintains the backward position and does not move forward or backward, thus preventing vibration at the time of impact occurrence.

Vibration Drill Mode

Figure 9A:
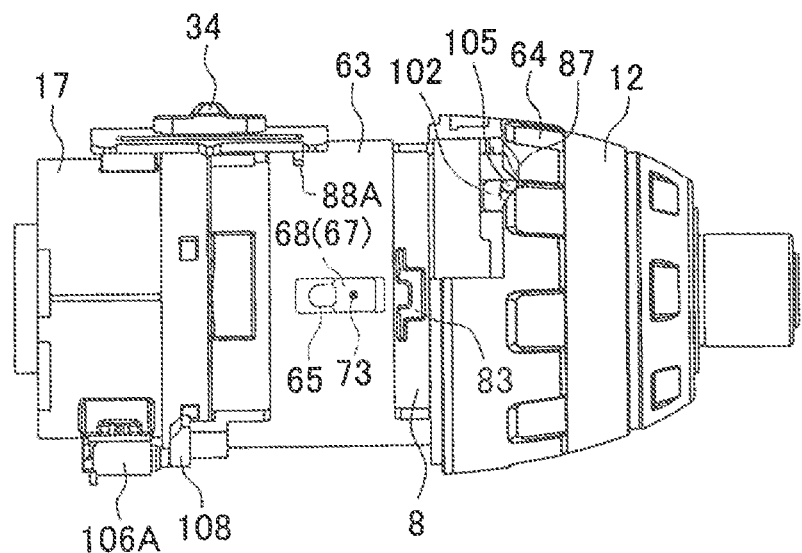
FIG. 9A is a left side view of the unit portion in a vibration drill mode.
Figure 9B:
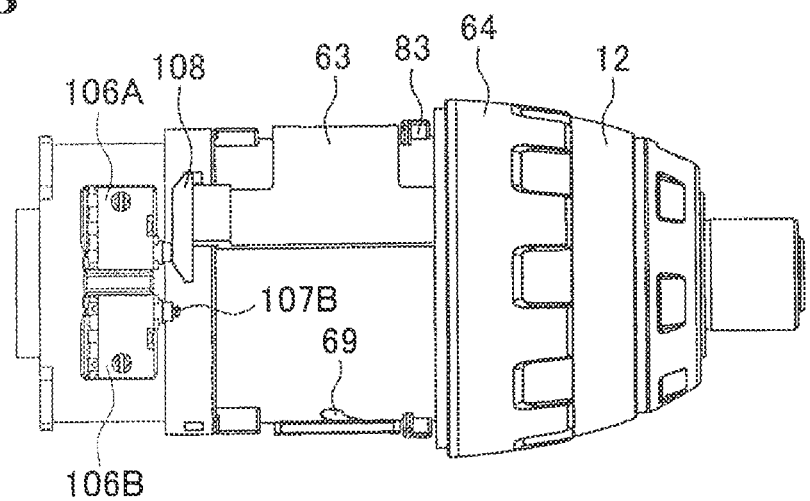
FIG. 9B is a bottom view thereof.
Figure 10:
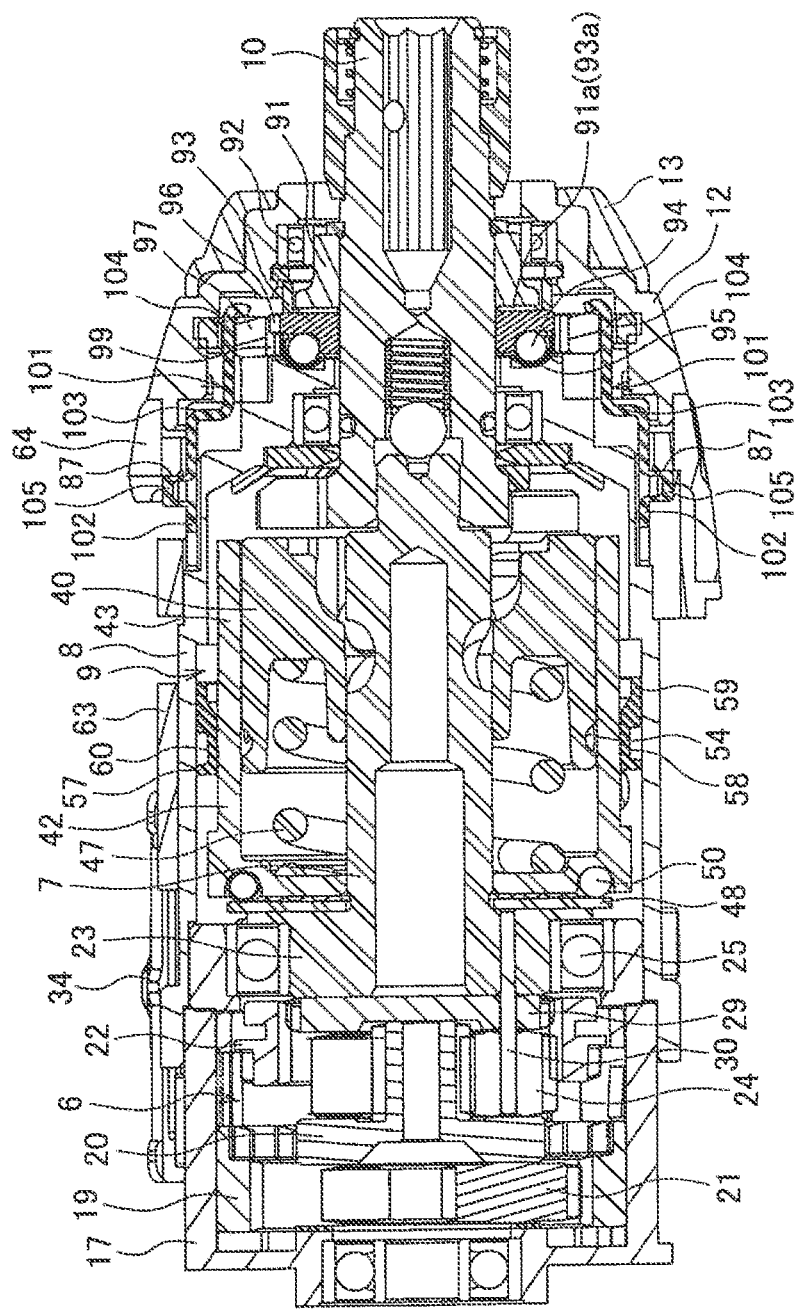
FIG. 10 is a vertical-sectional view of the unit portion in the vibration drill mode.
Figure 12:
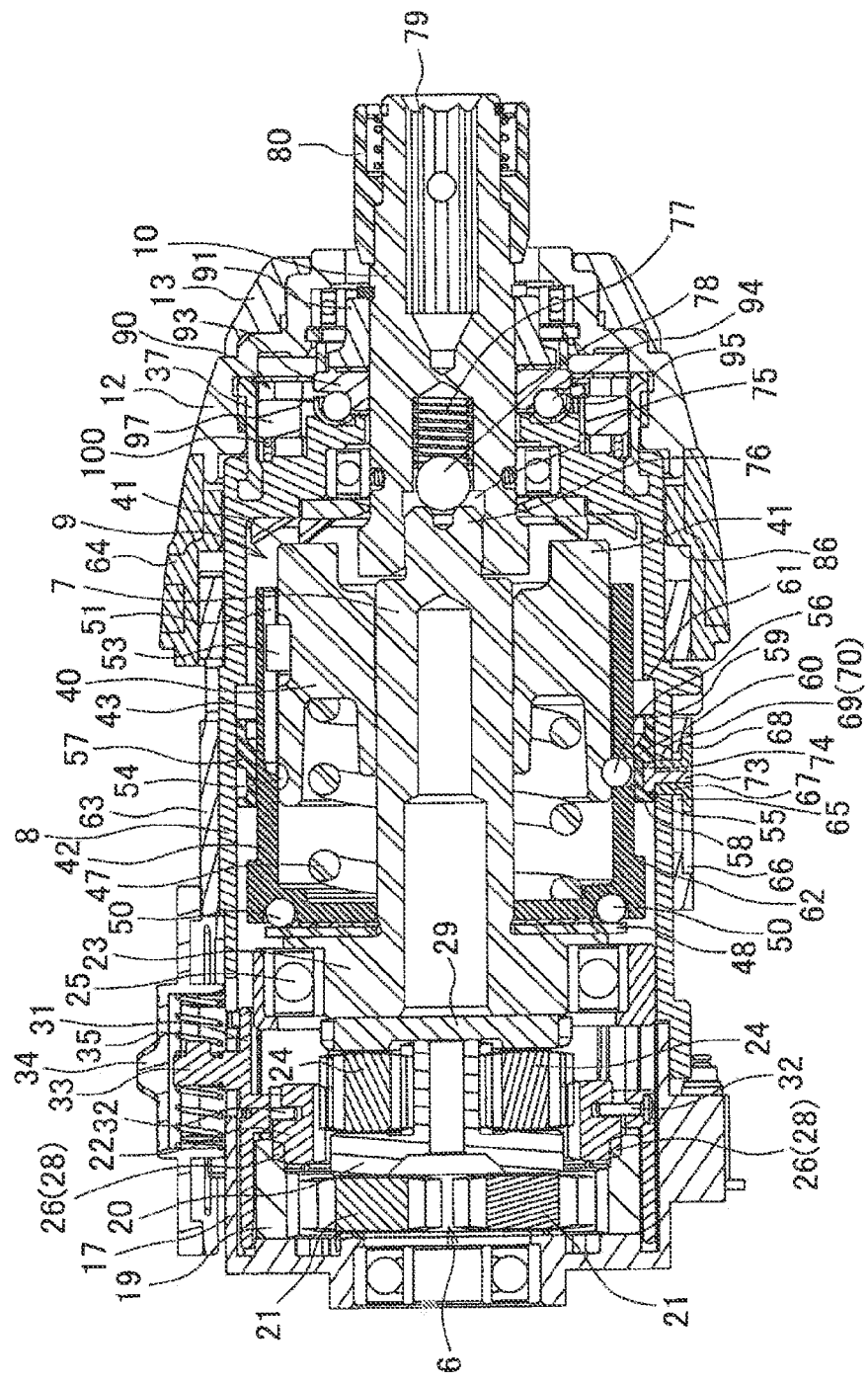
FIG. 12 is a vertical-sectional view of the unit portion in the drill mode.

Next, in a second position in which the mode switching ring 64 is rotated to the left to a predetermined angle from the first position as shown in FIGS. 9A and 9B, the guide holder 67 also moves in the left rotation direction in the circumferential direction and moves in the guide groove 69 to reach the front side groove 70. The guide holder 67 is located at the front end of the through hole 65. The switching ring 57 is in the forward position in which the small diameter portion 58 is located outside the ball 56, as shown in FIG. 10. In the forward position, the ball 56 is pushed by the small diameter portion 58 as shown in FIG. 12 and fixed to a connecting position to fit with the fitting groove 54 of the main hammer 40. Therefore, the main hammer 40 and the sub hammer 42 are connected in the front-rear direction such that a backward movement of the main hammer 40 is restricted.

At this time, the engaging protrusion 105 of the link plate 101 moves forward and fits with the recess portion 87, because the recess portion 87 is in the same phase. Thus, the vibration switching ring 97 moves to the forward position, and a vibration drill mode that restricts the rotation of the second cam 93 is achieved.

It should be noted that when the link plate 101 moves forward, the vibration switching ring 97 may not be able to move to the forward position due to a match in phase between the inner protrusion 99 of the vibration switching ring 97 and the protrusion 96 of the second cam 93. However, when the first cam 91 rotates together with the anvil 10 to rotate the second cam 93 that engages with the first cam 91, a difference occurs in phase between the protrusion 96 and the inner protrusion 99 because the vibration switching ring 97 is biased by the coil spring 100. Therefore, the vibration switching ring 97 is able to move forward and restrict the rotation of the second cam 93.

The first elongated protrusion 88A is still located in the rear of the receiving protrusion 89 in the same manner as in the impact mode. Therefore, a backward movement of the slide button 34 is restricted, and the high-speed mode is achieved constantly. The contact member 108 presses only the plunger 107A of the microswitch 106A, and therefore a clutch is not activated.

When the trigger 16 is manipulated to rotate the spindle 7, the spindle 7 causes the main hammer 40 to rotate via the ball 46, thereby engaging the anvil 10 with the main hammer 40 to rotate. When the first cam 91 rotates along with the rotation of the anvil, the cam surface 91a and the cam surface 93a of the second cam 93 of which the rotation is restricted interfere with each other. The anvil 10 is rotatably supported in a state where there is a play in the front and the rear of the arm 11. Therefore, due to the interference between the cam surfaces 91*a* and 93*a*, vibration of the anvil 10 occurs in the axial direction. The sub hammer 42 connected to the main hammer 40 in the rotational direction via the connecting pin 53 also rotates integrally with the main hammer 40.

An engagement or disengagement operation of the main hammer 40 with respect to the anvil 10 is not performed even if the torque of the anvil 10 increases, because a backward movement of the main hammer 40 is restricted by the ball 56. Thus, impact does not occur, and the anvil 10 rotates integrally with the spindle 7.

Drill Mode

Figure 11A:
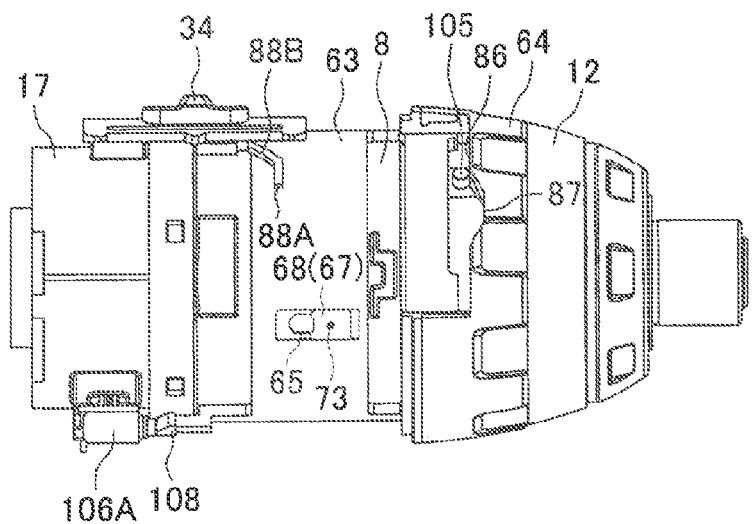
FIG. 11A is a left side view of the unit portion in a drill mode.
Figure 11B:
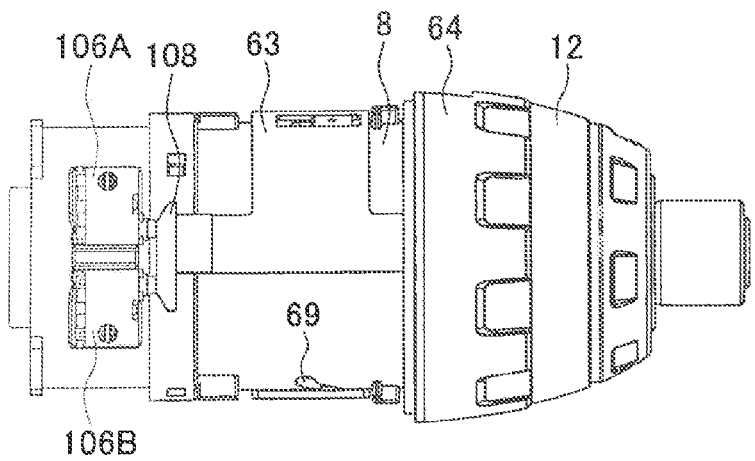
FIG. 11B is a bottom view thereof.

Next, in a third position in which the mode switching ring 64 is rotated to the left to a predetermined angle from the second position as shown in FIGS. 11A and 11B, the guide holder 67 also moves in the left rotation direction in the circumferential direction but stays located in the front side groove 70. Therefore, the state in which the guide holder 67 is located at the front end of the through hole 65 does not change. Accordingly, as also shown in FIG. 12, the switching ring 57 is in the forward position, and the ball 56 is pushed by the small diameter portion 58 and fixed in the connecting position to fit with the fitting groove 54 of the main hammer 40. Thus, the main hammer 40 and the sub hammer 42 are connected in the front-rear direction, a drill mode in which a backward movement of the main hammer 40 is restricted is achieved.

In the above state, the engaging protrusion 105 of the link plate 101 is latched to the step portion 86 again due to the recess portion 87 moving to the left side. Therefore, the link plate 101 is in the backward position, causing the vibration switching ring 97 to move backward and allowing the second cam 93 to rotate freely. The contact member 108 simultaneously presses the plungers 107A and 107B of both of the microswitches 106A and 106B, and therefore the clutch is not activated.

The first elongated protrusion 88A moves away from the slide button 34 to the left side and the end portion of the second elongated protrusion 88B is located in the rear of the receiving protrusion 89. Therefore, a backward movement of the slide button 34 becomes possible, as shown in FIG. 12. Thus, either mode of high or low speed can be selected.

When the trigger 16 is manipulated to rotate the spindle 7, the spindle 7 causes the main hammer 40 to rotate via the ball 46, thereby causing the anvil 10 engaged with the main hammer 40 to rotate. At this time, the sub hammer 42 connected to the main hammer 40 in the rotational direction via the connecting pin 53 also rotates integrally with the main hammer 40. It should be noted that even if the first cam 91 rotates along with the rotation of the anvil 10, vibration does not occur in the anvil 10 because the second cam 93 opposing the first cam 91 is rotatable.

An engagement or disengagement operation of the main hammer 40 with respect to the anvil 10 is not performed even if the torque of the anvil 10 increases, because a backward movement of the main hammer 40 is restricted by the ball 56. Thus, impact does not occur, and the anvil 10 rotates integrally with the spindle 7.

Clutch Mode

Figure 13A:
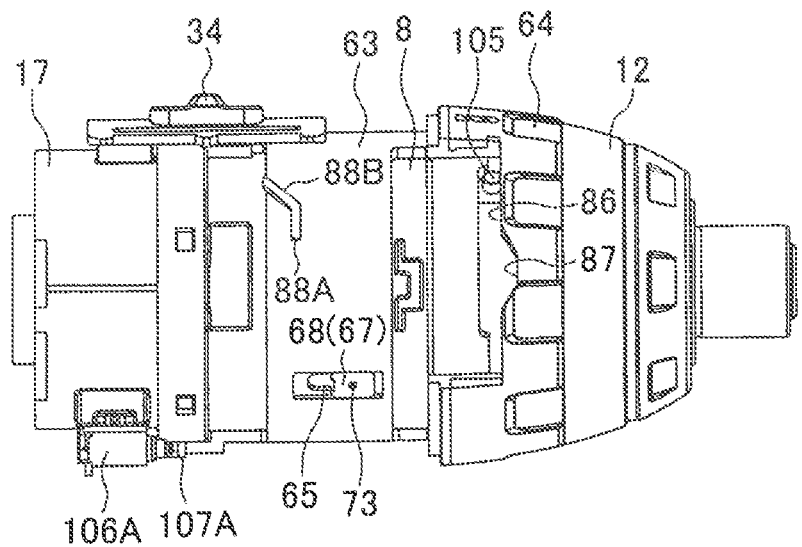
FIG. 13A is a left side view of the unit portion in a clutch mode.
Figure 13B:
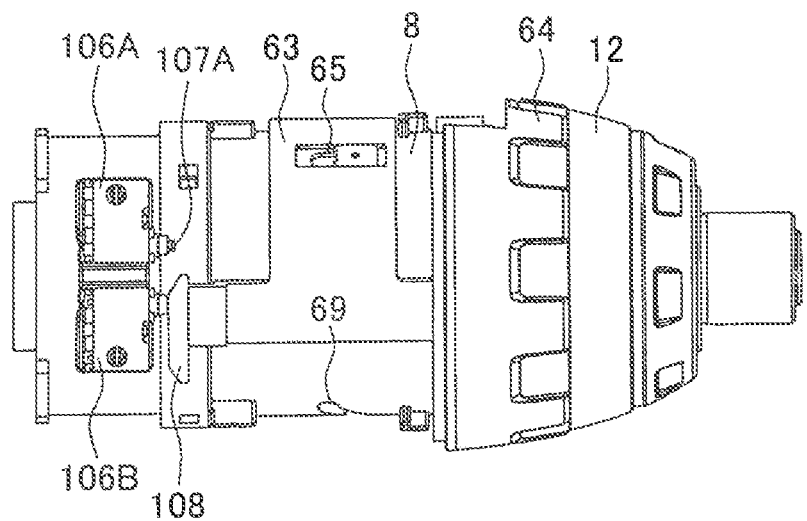
FIG. 13B is a bottom view thereof.
Figure 14:
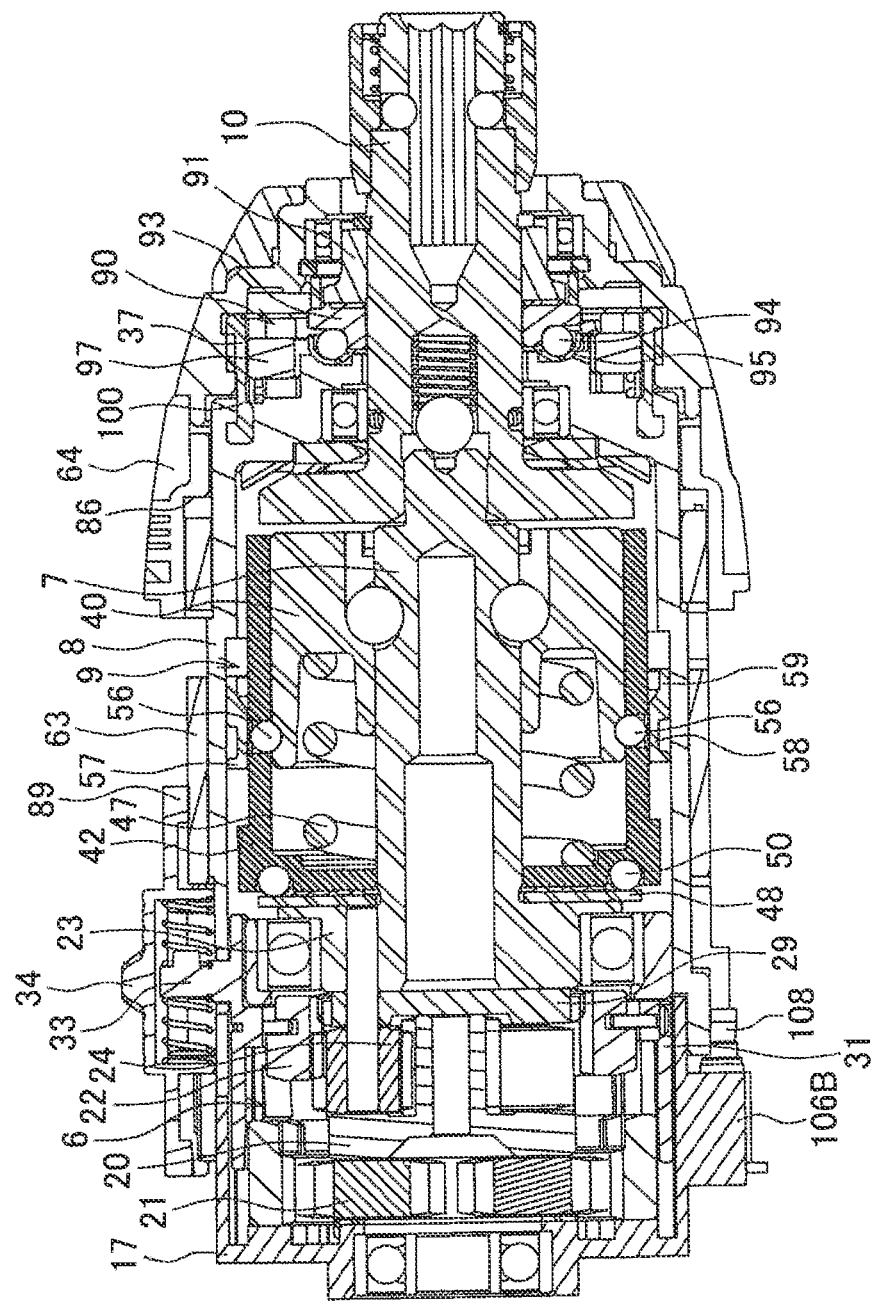
FIG. 14 is a vertical-sectional view of the unit portion in the clutch mode.

Next, in a fourth position in which the mode switching ring 64 is rotated to the left to a predetermined angle from the third position as shown in FIGS. 13A and 13B, the guide holder 67 also moves in the left rotation direction in the circumferential direction but stays located in the front side groove 70. Therefore, the state in which the guide holder 67 is located at the front end of the through hole 65 does not change, as shown in FIG. 14. Thus, the switching ring 57 is in the forward position, such that the ball 56 is pushed by the small diameter portion 58 and fixed in the connecting position to fit with the fitting groove 54 of the main hammer 40. The main hammer 40 and the sub hammer 42 are connected in the front-rear direction to restrict a backward movement of the main hammer 40.

At this time, the engaging protrusion 105 of the link plate 101 is latched to the step portion 86 in the same manner as in the third position. Therefore, the link plate 101 is in the backward position and the vibration switching ring 97 is moved backward, to make the second cam 93 rotatable. It should be noted that the contact member 108 presses only the plunger 107B of the microswitch 106B, and therefore the clutch mode is achieved.

The first and second elongated protrusions 88A and 88B are apart to the left side from the slide button 34. Therefore, a slide operation of the slide button 34 to either the front or the rear is possible.

Therefore, when the trigger 16 is manipulated to rotate the spindle 7, the spindle 7 causes the main hammer 40 to rotate via the ball 46, thereby causing the anvil 10 engaged with the main hammer 40 to rotate. At this time, the sub hammer 42 connected to the main hammer 40 in the rotational direction via the connecting pin 53 also rotates integrally with the main hammer 40. It should be noted that even if the first cam 91 rotates along with the rotation of the anvil 10, vibration does not occur in the anvil 10 because the second cam 93 opposing the first cam 91 is rotatable.

Then, when the torque of the anvil 10 increases and the torque value detected by the torque sensor reaches the set torque value, brake is applied to the motor 4 such that the torque transmission from the spindle 7 to the anvil 10 is blocked.

It should be noted that, as shown in FIG. 2, indications M1 (impact mode), M2 (vibration drill mode), M3 (drill mode), and M4 (clutch mode) corresponding to respective operation modes are indicated on the outer circumferential surface of the mode switching ring 64. Each operation mode is selected by aligning each indication to an arrow 109 indicated at the front end on the upper surface of the body housing 2.

In the case of switching from the drill mode or the clutch mode used at low speed to the vibration drill mode or the impact mode, the operation is performed in reverse. More specifically, the second elongated protrusion 88B apart from the slide button 34 engages with the receiving protrusion 89 of the slide button 34 in the backward position due to the rightward rotation of the link sleeve 63. The receiving protrusion 89 is caused to slide relatively along the second elongated protrusion 88B along with the rotation of the link sleeve 63 and the slide button 34 is caused to move to the forward position. Thus, the high-speed mode is achieved constantly in the vibration drill mode and the impact mode.

In this manner, the impact driver 1 in the embodiment described above includes, between the mode switching ring 64 and the slide button 34, a link unit (the link sleeve 63 and the first and second elongated protrusions 88A and 88B). With the link unit, a switching operation of the slide button 34 to the high-speed side is performed in conjunction with a selecting operation of the mode switching ring 64 to the impact mode or the vibration drill mode and the rotation speed is held at high speed. Therefore, manipulation of the slide button 34 becomes unnecessary in the predetermined operation mode (the impact mode or the vibration drill mode) used only in the high-speed mode, even in a case where the mode switching ring 64 and the slide button 34 are provided separately. Thus, user-friendliness is achieved and a decrease in performance does not occur.

Particularly herein, the mode switching member is the mode switching ring 64 that enables selection of an operation mode through a rotating operation, and the speed switching member is provided in the rear of the mode switching ring 64 to be slidable in the front-rear direction between the forward position for high speed and the backward position for low speed. The link unit includes the link sleeve 63, the first elongated protrusion 88A, and the second elongated protrusion 88B. The link sleeve 63 is connected in the rear of the mode switching ring 64 and rotates integrally with the mode switching ring 64. The first elongated protrusion 88A is provided along the rotational direction on the outer surface of the link sleeve 63 and, in the switching position for the impact mode and the vibration drill mode, engages with the receiving protrusion 89 of the slide button 34 in the forward position to restrict a backward movement of the slide button 34. The second elongated protrusion 88B is connected with and inclined from the first elongated protrusion 88A and engages with the lower surface of the slide button 34 in the backward position along with the rotation of the link sleeve 63 to cause the slide button 34 to move forward and engage with the first elongated protrusion 88A. Thus, the link unit can be formed easily.

The plurality of operation mechanisms include the vibration mechanism 90 that provides vibration in the axial direction to the anvil 10, and the high-speed mode is achieved automatically in the vibration drill mode. Therefore, user-friendliness in the vibration drill mode used mostly in the high-speed mode can be improved.

It should be noted that although the high-speed mode is achieved constantly in the vibration drill mode and the impact mode in the embodiment described above, the high-speed mode may be achieved constantly only in one of the operation modes or the high-speed mode may be achieved constantly in another operation mode.

Although there is only one inclined second elongated protrusion, the second elongated protrusion can be connected with the first elongated protrusion on each of the left and right, in a case where the switching position for the vibration drill mode or the impact mode is located between switching positions for other operation modes.

Furthermore, the first and second elongated protrusions are provided to the link sleeve separate from the mode switching ring and the first and second elongated protrusions are engaged with or disengaged from the receiving protrusion provided to the slide button to move the slide button in the embodiment described above. However, the first and second protruding portions are not limited to such elongated protrusions and may be appropriately modified to, for example, a quadrangle-shaped protrusion for the first protruding portion and a triangle-shaped protrusion for the second protruding portion such that a trapezoid shape is formed as a whole, or the like.

MODIFICATION EXAMPLE

Although the forward position of the slide button is for high speed and the backward position is for low speed in the transmission mechanism of the embodiment described above, the present invention can be applied to a transmission mechanism with a reverse configuration. One such example is shown in FIGS. 15A, 15B, 16A and 16B. It should be noted that identical components as in the previous embodiment are denoted by the same reference numerals, and redundant descriptions are omitted.

An electric power tool shown herein is a vibration driver drill 120. An inner housing 121 assembled in the front of a motor includes a planetary gear reduction mechanism 122, a vibration mechanism 123 serving as an operation mechanism, and a mechanical clutch mechanism 124, forming a unit. Three operation modes of the vibration drill mode, drill mode, and the clutch mode are selectable. The basic configuration is similar to the vibration driver drill described in Japanese Patent No. 4227028 mentioned earlier.

The planetary gear reduction mechanism 122 is provided with the second internal gear 22 that is movable forward or backward. A slide operation of the slide button 34 enables switching between the backward position in FIGS. 15A and 15B in which the second internal gear 22 simultaneously meshes with the first carrier 20 and the second-stage planet gear 24, and the forward position in FIGS. 16A and 16B in which the second internal gear 22 meshes only with the planet gear 24 such that rotation is restricted in the inner housing 121. Thus, herein, the high-speed mode (second speed) is achieved in the backward position, and the low-speed mode (first speed) in the forward position.

The vibration mechanism 123 includes the first cam 91, the second cam 93, a pair of vibration switching levers 125, and a coil spring 126. The first cam 91 is integrally secured to the spindle 7 that serves as the final output shaft. The second cam 93 is fitted to be rotatable to the exterior at the rear of the first cam 91. A pair of vibration switching levers 125 is movable forward or backward between the forward position in which the vibration switching levers 125 engage with the second cam 93 to restrict the rotation thereof, and the backward position in which the vibration switching levers 125 is apart from the second cam 93 to allow the rotation thereof. A coil spring 126 biases each vibration switching lever 125 to the forward position. By a rotating operation of the mode switching ring 64, the vibration switching lever 125 can be pressed to the backward position against the bias of the coil spring 126.

In the clutch mechanism 124, a third carrier 127 is provided to the spindle 7, and a third internal gear 129 with which a third-stage planet gear 128 supported by the third carrier 127 meshes is provided to be rotatable. By pressing the third internal gear 129 with a coil spring 132 via a ball 130 and a washer 131 and changing the axial length of the coil spring 132 through a rotating operation of a change ring 133 provided to the front end of the inner housing 121, the pressing force of the coil spring 132 that restricts the rotation of the third internal gear 129 is adjustable. It should be noted that the tip end of the spindle 7 is provided with a chuck 134 for gripping a bit.

In a first position in which the mode switching ring 64 is rotated to the leftmost position when seen from the front, a forward movement of the vibration switching lever 125 is allowed to restrict the rotation of the second cam 93. Further, the inner circumference of the washer 131 that rotates integrally with the inner housing 121 is engaged with the inner housing 121 to restrict the movement of the ball 130. Thus, the vibration drill mode that restricts the rotation of the third internal gear 129 is achieved. In a second position in which the mode switching ring 64 is rotated rightward to a predetermined angle from the first position, the vibration switching lever 125 is moved backward to allow the second cam 93 to rotate. Further, the inner circumference of the washer 131 is released from engagement with the inner housing 121. Thus, the clutch mode in which the restriction on the rotation of the third internal gear 129 is released is achieved. Furthermore, in a third position in which the mode switching ring 64 is rotated rightward to a predetermined angle from the second position, the backward position of the vibration switching lever 125 is maintained. Further, the inner circumference of the washer 131 is engaged again with the inner housing 121. Thus, the drill mode in which the rotation of the third internal gear 129 is restricted is achieved.

Herein, a link ring 135 that rotates integrally with the mode switching ring 64 is connected to the rear end of the mode switching ring 64, and a front link plate 136 protruding toward the rear and having an inclined guide portion 137 as the left side edge is formed at the rear end of the link ring 135. At the front end of the slide button 34, a rear link plate 138 is provided so as to protrude toward the front and having an inclined guide portion 139 as the right side edge with the same angle as the inclined guide portion 137. In the first position of the mode switching ring 64 (for the vibration drill mode), the front link plate 136 is located in the front of the rear link plate 138 to restrict a forward movement of the slide button 34 as shown in FIG. 15A. In the second and third positions (for the clutch mode and the drill mode), the front link plate 136 moves to the right side of the rear link plate 138 to allow a forward movement of the slide button 34. FIGS. 16A and 16B show the clutch mode.

Thus, in the case where the vibration drill mode is selected after the clutch mode or the drill mode used at low speed, contact between the inclined guide portion 137 of the front link plate 136 that moves together with the rotation of the mode switching ring 64 and the inclined guide portion 139 of the rear link plate 138 of the slide button 34 causes the slide button 34 to automatically move backward, resulting in a constant use at high speed.

As described above, the vibration driver drill 120 also includes the link unit (the front link plate 136, the rear link plate 138, and the inclined guide portions 137 and 139) between the mode switching ring 64 and the slide button 34. Therefore, manipulation of the slide button 34 becomes unnecessary in the predetermined operation mode (the vibration drill mode) used only in the high-speed mode, even in a case where the mode switching ring 64 and the slide button 34 are provided separately. Thus, user-friendliness is achieved and a decrease in performance does not occur.

Particularly herein, the link unit is the front link plate 136, which is provided on the mode switching ring 64 side to protrude rearward. In the switching position for the vibration drill mode, the front link plate 136 contacts the rear link plate 138 of the slide button 34 in the backward position to restrict the forward movement thereof. The front link plate 136 includes, at the side edge thereof, the inclined guide portion 137 that contacts the inclined guide portion 139 of the rear link plate 138 for the slide button 34 in the forward position along with the rotation of the mode switching ring 64 so as to cause the slide button 34 to slide to the backward position. Thus, the link unit can be formed easily.

The link plates are provided to both the mode switching ring and the slide button in the modification example described above. However, the link plate on the slide button side may omitted with the link plate protruding only from the mode switching ring so that the link plate contacts the slide button directly, if the distance between the mode switching ring and the slide button is small. The link ring may be omitted and the link plate may be directly formed at the mode switching ring.

Further, in the modification example described above, when the switching position for the vibration drill mode is provided between switching positions for other operation modes, the inclined guide portion may be formed at each of left and right side edges of the link plate.

In addition, it is common to each embodiment that the operation mechanism such as the striking mechanism or the vibration mechanism is not limited to the structure described above. The operation mechanism may be appropriately modified if the structure enables a plurality of operation modes to be selected through manipulation of the mode switching member. The planetary gear reduction mechanism or the clutch mechanism may also be appropriately modified.

Although switching is made possible through the rotating operation for the mode switching member and the slide operation to the front or the rear for the speed switching member in the description above, this is not limiting. For example, even in a case where the slide operation of the speed switching member is performed to the left or right direction, coordination is possible by providing the mode switching member with a protruding portion or a link plate that contacts the speed switching member in a switching position for a predetermined operation mode to restrict the slide of the speed switching member, or the like.

Furthermore, the present invention can be applied to an electric power tool without the vibration drill mode by, for example, enabling automatic switching to the high-speed mode only in the impact mode for an impact driver without a vibration mechanism, or the like.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An electric power tool comprising:
   an electric motor configured to output rotation about a longitudinal axis;
   a final output shaft configured to rotate about the longitudinal axis and to which rotation is transmitted from the motor;
   a plurality of operation mechanisms configured to cause the final output shaft to operate in a plurality of predetermined operation modes including at least a first mode configured to cause the final output shaft to vibrate along the longitudinal axis;
   a mode switching member configured to rotate about the longitudinal axis between a plurality of positions, wherein rotation of the mode switching member enable a selecting operation for the plurality of operation modes;
   a transmission mechanism configured to convert the output rotation of the electric motor into a high stage and low stage rotation speed of the final output shaft;
   a speed switching member that enables a selecting operation for the rotation speed between the high and low stage; and
   a link unit configured to cooperate with the mode switching member and the speed switching member such that rotation of the mode switching member to a position corresponding to the first mode causes a switching operation of the speed switching member to a position corresponding to the high stage so as to hold the rotation speed at high speed when the final output shaft is configured to vibrate along the longitudinal axis.

2. The electric power tool according to claim 1, wherein the speed switching member is provided in a rear of the mode switching member to be slidable in a front-rear direction between a forward position for high speed and a backward position for low speed.

3. The electric power tool according to claim 2, wherein the link unit includes a link member connected to the rear of the mode switching member to rotate integrally together, a first protruding portion that is provided along a rotational direction on an outer surface of the link member and, in a switching position for the predetermined operation mode, engages with a lower surface of the speed switching member in the forward position to restrict a backward movement of the speed switching member, and a second protruding portion that is connected with and inclined from the first protruding portion and engages with the lower surface of the speed switching member in the backward position along with a rotation of the link member to cause the speed switching member to move forward and engage with the first protruding portion.

4. The electric power tool according to claim 3, wherein the link member is a cylinder-shaped link sleeve fitted to an exterior of an inner housing accommodating the operation mechanism.

5. The electric power tool according to claim 4, wherein the first protruding portion is a first elongated protrusion formed in a circumferential direction on an outer circumferential surface of the link sleeve, and the second protruding portion is a second elongated protrusion inclined from an end portion of the first elongated protrusion.

6. The electric power tool according to claim 5, wherein a receiving protrusion that engages with a tip end of the second elongated protrusion when the link sleeve rotates in a backward position is provided to a lower surface of the speed switching member.

7. The electric power tool according to claim 1, wherein the the speed switching member is provided in a rear of the mode switching member to be slidable in a front-rear direction between a backward position for high speed and a forward position for low speed.

8. The electric power tool according to claim 7, wherein the link unit is a link plate that is provided on a side of the mode switching member to protrude rearward and, in a switching position for the predetermined operation mode, contacts the speed switching member in the backward position to restrict a forward movement of the speed switching member, and an inclined guide portion is provided at a side edge of the link plate so as to contact the speed switching member in the forward position along with a rotation of the mode switching member to cause the speed switching member to slide to the backward position.

9. The electric power tool according to claim 1, wherein the plurality of operation mechanisms include a vibration mechanism that provides vibration in an axial direction to the final output shaft, and the predetermined operation mode is a vibration drill mode in which the vibration mechanism is activated.

10. The electric power tool according to claim 9, wherein the vibration mechanism includes a first cam secured integrally to the final output shaft, a second earn that interlocks with a rear of the first cam and is fitted to an exterior of the final output shaft to be rotatable, and a vibration switching member that is provided in a rear of the second cam to be movable forward or backward between a forward position in which the vibration switching member is latched to the second cam so as to restrict rotation and a backward position in which the vibration switching member is apart from the second cam, and the vibration switching member is caused to move forward or backward through manipulation of the mode switching member.

11. The electric power tool according to claim 10, wherein one of the plurality of predetermined operation modes includes the activation of a clutch configured to disrupt transmission of rotation between the electric motor and the final output shaft.

12. The electric power tool according to claim 11, wherein disruption of transmission of rotation between the electric motor and the final output shaft is caused by activation of an electric clutch.

13. The electric power tool according to claim 1, wherein the plurality of operation mechanisms include a striking mechanism that provides a striking force in a rotational direction to the final output shaft, and the predetermined operation mode is an impact mode in which the striking mechanism is activated.

14. The electric power tool according to claim 1, wherein the transmission mechanism enables switching of rotation speed between two stages of high and low by sliding, with the speed switching member, one internal gear of a planetary gear reduction mechanism including planet gears of a plurality of stages provided adjacent to each other in an axial direction, between a first slide position in which the internal gear meshes both with a spur gear provided to a carrier of the planet gear on an inside of the internal gear and with the planet gear and a second slide position in which the internal gear meshes with only the planet gear in a state where rotation is restricted.

15. The electric power tool according to claim 1, wherein one of the plurality of predetermined operation modes includes at least a second mode configured to cause the final output shaft to simultaneously vibrate and rotate along the longitudinal axis.

16. The electric power tool according to claim 15, wherein one of the plurality of predetermined operation modes includes at least a third mode configured to cause the final output shaft to rotate along the longitudinal axis.

17. An electric power tool comprising:
an electric motor configured to output rotation about a longitudinal axis;
a final output shaft configured to rotate about the longitudinal axis and to which rotation is transmitted from the motor;
a plurality of operation mechanisms configured to cause the final output shaft to operate in a plurality of predetermined operation modes including at least a first mode configured to cause the final output shaft to vibrate along the longitudinal axis, and a second mode configured to disrupt transmission of rotation between the electric motor and the final output shaft;
a mode switching member configured to rotate about the longitudinal axis between a plurality of positions, wherein rotation of the mode switching member enable a selecting operation for the plurality of operation modes;
a transmission mechanism configured to convert the output rotation of the electric motor into a high stage and low stage rotation speed of the final output shaft;
a speed switching member that enables a selecting operation for the rotation speed between the high and low stage; and
a link unit configured to cooperate with the mode switching member and the speed switching member such that rotation of the mode switching member to a position corresponding to the first mode causes a switching operation of the speed switching member to a position corresponding to the high stage so as to hold the rotation speed at high speed when the final output shaft is configured to vibrate along the longitudinal axis,
wherein the second mode activates an electric clutch that disrupts rotation transmission of rotation between the electric motor and the final output shaft by de-energizing the electric motor.

18. An electric power tool comprising:
a motor,
a spindle rotated by the motor,
a hammer being rotatable by the spindle,
an anvil provide a striking force in a rotational direction by the motor,
a first cam fixed to the anvil,
a second cam vibrating the anvil by engaging with the first cam, and
a mode switching member that is ring-shaped and capable of switching modes among a first mode, a second mode, a third mode and a forth mode,
wherein the first mode is configured to provide a striking force to the anvil by the hammer, the second mode is configured to enable the first cam to interfere with the second cam, the third mode is configured to enable the anvil to constantly rotate integrally with the spindle, and the forth mode is configured to rotate the anvil integrally with the spindle and to block torque transmission from the motor to the anvil when the torque value reaches the set torque value.

19. The electric power tool according to claim 18, wherein the motor is accommodated in a housing and the switching mode member is arranged in a front of the housing.

* * * * *